United States Patent
Goldstein et al.

(10) Patent No.: US 11,244,685 B2
(45) Date of Patent: Feb. 8, 2022

(54) NETWORK COMPUTER SYSTEM TO GENERATE VOICE RESPONSE COMMUNICATIONS

(71) Applicant: Uber Technologies, Inc., San Francisco, CA (US)

(72) Inventors: Lawrence Benjamin Goldstein, San Francisco, CA (US); Arjun Vora, San Francisco, CA (US); Gokhan Tur, San Francisco, CA (US); Manisha Mundhe, San Francisco, CA (US); Xiaochao Yang, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 320 days.

(21) Appl. No.: 16/560,756

(22) Filed: Sep. 4, 2019

(65) Prior Publication Data

US 2020/0075016 A1 Mar. 5, 2020

Related U.S. Application Data

(60) Provisional application No. 62/726,980, filed on Sep. 4, 2018.

(51) Int. Cl.
*G10L 21/00* (2013.01)
*G10L 25/00* (2013.01)
(Continued)

(52) U.S. Cl.
CPC .............. *G10L 15/26* (2013.01); *G06F 3/167* (2013.01); *G06Q 10/02* (2013.01); *G06Q 50/30* (2013.01);
(Continued)

(58) Field of Classification Search
CPC ........ G06F 3/167; G06Q 10/02; G06Q 50/30; G10L 15/22; G10L 15/26; G10L 2015/223
(Continued)

(56) References Cited

U.S. PATENT DOCUMENTS 8,140,335 B2 * 3/2012 Kennewick ............. G10L 15/19
704/257
10,347,248 B2 * 7/2019 Kennewick ............. G10L 15/19
(Continued)

FOREIGN PATENT DOCUMENTS

CN 106782558 5/2017
KR 10-2015-0090876 8/2015

OTHER PUBLICATIONS

ISR and Written Opinion in PCT/US2019/049586 dated Dec. 6, 2019.

*Primary Examiner* — Khai N. Nguyen
(74) *Attorney, Agent, or Firm* — Mahamedi IP Law LLP

(57) ABSTRACT

A network computer system for managing a network service (e.g., a transport service) can include a voice-assistant subsystem for generating dialogues and performing actions for service providers of the network service. The network computer system can receive, from a user device, a request for the network service. In response, the network computer system can identify a service provider and transmit an invitation to the provider device of the service provider. In response to the identification of the service provider for the request, the voice-assistant subsystem can trigger an audio voice prompt to be presented on the provider device and a listening period during which the provider device monitors for an audio input from the service provider. Based on the audio input captured by the provider device, the network computer system can determine an intent corresponding to
(Continued)

whether the service provider accepts or declines the invitation.

20 Claims, 17 Drawing Sheets

(51) Int. Cl.
*G10L 15/26* (2006.01)
*G10L 15/22* (2006.01)
*G06Q 10/02* (2012.01)
*G06Q 50/30* (2012.01)
*G06F 3/16* (2006.01)

(52) U.S. Cl.
CPC ........ *G10L 15/22* (2013.01); *G10L 2015/223* (2013.01)

(58) Field of Classification Search
USPC ......................................................... 704/275
See application file for complete search history.

(56) References Cited

U.S. PATENT DOCUMENTS

| | | | |
|---|---|---|---|
| 11,112,255 B2* | 9/2021 | Rahematpura | G01C 21/3407 |
| 2007/0276586 A1* | 11/2007 | Jeon | G01C 21/3608 |
| | | | 701/533 |
| 2009/0150156 A1* | 6/2009 | Kennewick | G10L 15/00 |
| | | | 704/257 |
| 2012/0116669 A1* | 5/2012 | Lee | G01C 21/3608 |
| | | | 701/419 |
| 2014/0334645 A1* | 11/2014 | Yun | G10L 15/22 |
| | | | 381/110 |
| 2015/0269939 A1* | 9/2015 | Gruchalski | G01C 21/3608 |
| | | | 704/251 |
| 2017/0352125 A1* | 12/2017 | Dicker | G06Q 10/1097 |
| 2018/0159921 A1* | 6/2018 | Brinig | H04L 67/24 |
| 2020/0075016 A1* | 3/2020 | Goldstein | G06F 3/167 |
| 2020/0292335 A1* | 9/2020 | Rahematpura | G08G 1/202 |

* cited by examiner

NETWORK COMPUTER SYSTEM TO GENERATE VOICE RESPONSE COMMUNICATIONS

CROSS-REFERENCE TO RELATED APPLICATIONS

This application claims the benefit of Provisional U.S. Patent Application Ser. No. 62/726,980, filed Sep. 4, 2018, and titled "Network Computer System to Generate Voice Response Communications"; the aforementioned priority application being hereby incorporated by reference in its entirety.

BACKGROUND

Network computer systems can facilitate service arrangements between users, including on-demand service arrangements. Such service arrangements often require coordination between providers, who often operate vehicles, and other entities, such as requesters, third-parties or a network service that provides arrangements or other services for the provider.

DETAILED DESCRIPTION

Figure 1:
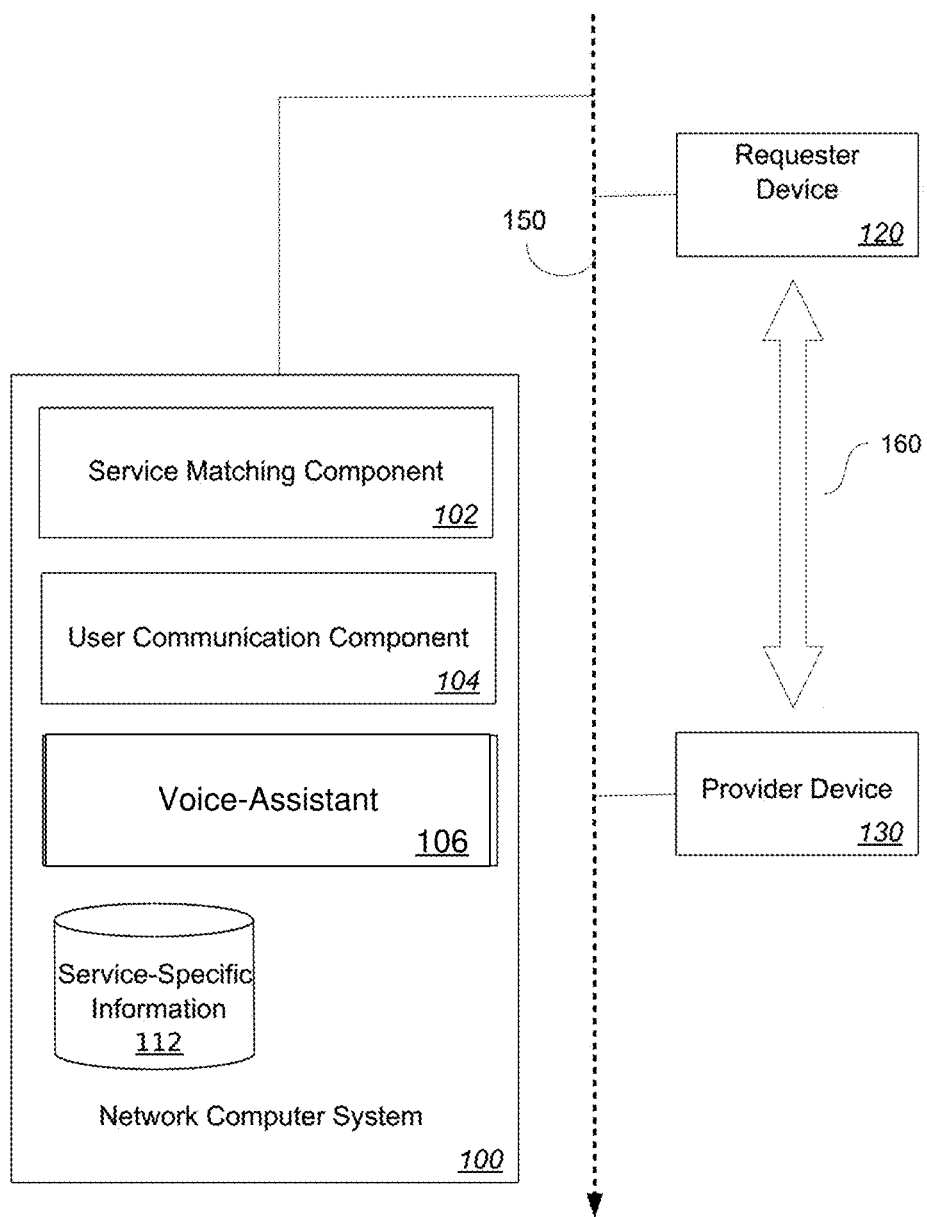
FIG. 1 illustrates an example network computer system to provide enhanced assistance and services to providers of a network service, according to one or more examples.

According to some examples, a network computer system implements a voice-responsive service through a provider device, to prompt for and receive provider input and interaction. As described with various examples, the voice-responsive service can include functionality that augments or enhances the operation of the provider device, specifically with respect to the activity the provider is performing (e.g., driving) and with respect to events or information that are specific to a current event, condition or state of the service provider.

Among other benefits, examples as described enhance the usability of the provider's mobile device, by facilitating useful and safe interaction with the provider while the provider is driving or performing another task. For example, service providers are currently required to use their hands to communicate back to the network service (e.g., to accept an invitation to fulfill a service request). In contrast, examples enable a network service (e.g., on-demand transport system) to communicate an invitation to the provider using audio output, and further to listen for the provider's response using a microphone of the provider's computing device. In such examples, the network computer system can enable the provider to receive and accept a new assignment without need of the provider using his or her hands to interact with their respective mobile computing device. Thus, by providing a voice assistant that can present information to service providers in new ways (e.g., via voice prompts) and by enabling service providers to interact and perform functions (e.g., navigate, accept invitations, send messages, contact support desk, etc.) in new ways (e.g., by speaking to the provider device), examples improve the usability and functionalities of the service provider device.

As used herein, a client device, a computing device, provider device, requester device and/or a mobile computing device refer to devices corresponding to desktop computers, cellular devices or smartphones, laptop computers, tablet devices, etc., that can provide network connectivity and processing resources for communicating with a service arrangement system over one or more networks. In another example, a computing device can correspond to an in-vehicle computing device, such as an on-board computer. Also, as described herein, a user can correspond to a requester of a network service (e.g., a rider) or a service provider (e.g., a driver and/or a vehicle) that provides location-based services for requesters.

Still further, examples described relate to a variety of location-based (and/or on-demand) services, such as a transport service, a food truck service, a delivery service, an entertainment service, etc., to be arranged between requesters and service providers. In other examples, the system can be implemented by any entity that provides goods or services for purchase through the use of computing devices and network(s). In examples described, the service arrangement system can correspond to a transport arrangement system that arranges transport and/or delivery services to be provided for riders by drivers of vehicles who operate service applications on respective computing devices.

One or more examples described provide that methods, techniques, and actions performed by a computing device are performed programmatically, or as a computer-implemented method. Programmatically, as used, means through the use of code or computer-executable instructions. These instructions can be stored in one or more memory resources of the computing device. A programmatically performed step may or may not be automatic.

One or more examples described can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs, or machines.

Some examples described can generally require the use of computing devices, including processing and memory resources. For example, one or more examples described may be implemented, in whole or in part, on computing devices such as servers, desktop computers, cellular or smartphones, and tablet devices. Memory, processing, and network resources may all be used in connection with the establishment, use, or performance of any example described herein (including with the performance of any method or with the implementation of any system).

Furthermore, one or more examples described may be implemented through the use of instructions that are executable by one or more processors. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other does not imply an ordering, timing, or any other characteristic of the referenced items unless otherwise specified; the term "and/or" as used herein refers to and encompasses any and all possible combinations of one or more of the associated listed items; that the terms "comprises" and/or "comprising" specify the presence of stated features, but do not preclude the presence or addition of one or more other features.

System Overview

FIG. 1 illustrates an example network computer system to provide enhanced assistance and services to providers of a network service. A network computer system 100 such as that shown in FIG. 1 can be implemented in a variety of computing environments, including as part of a network service provided through one or more servers. In some variations, the network computer system 100 is implemented as part of, or in connection with a network service to arrange transport, where the service matches service requests from requesters with service provider entities. For example, the service requests may correspond to on-demand transportation service requests, on-demand delivery service request, and/or other service requests. Still further, some examples provide for the network computer system 100 to be distributed using one or more servers and/or mobile devices.

The network computer system 100 may be implemented on a server, on a combination of servers, and/or on a distributed set of computing devices which communicate over a network 150, such as the Internet. In some examples, the network computing system 100 is implemented using mobile devices of users, including provider devices and requester devices, with the individual mobile devices each executing a corresponding service application that causes the respective mobile device to operate as an information inlet and/or outlet for the network computing system 100.

In some examples, the network computer system 100 includes a service matching component 102. The service matching component 102 matches a given service request from a requester device 120 with a provider entity associated with a provider device 130. The provider entity associated with the provider device 130 is assigned to perform the requested service for the user associated with the requester device 120. In examples, a service arrangement involves matching a service provider to a service request, and enabling or otherwise facilitating a service provider to fulfill the matched service request. In some implementations, a user can participate in a service implemented on the network computer system 100 as either a requester in a first service request and/or a provider in a different service request.

The network computer system 100 communicates with the requester device 120 and the provider device 130 over the network 150. While FIG. 1 is described in context of requester device 120 and provider device 130, network computer system 100 can implement functionality as described with examples of FIG. 1, using devices of requesters and/or providers in a given population of users.

In some implementations, a requester can use requester device 120 to submit a service request to the network computer system 100 over the network 150. The service matching component 102 matches the service request with a service provider entity. In examples, the provider entity is a user that is a service provider.

In some examples, the network computer system 100 includes a user communication component 104. The user communication component 104 may enable and/or otherwise manage communications for the requester device 120 and provider device 130, such as by (i) the network computer system 100 and the requester device 120, (ii) the network computer system and the provider device 130, and/or (iii) during a service arrangement. For example, after the service matching component 102 matches the service request submitted by the requester device 120 with the service provider entity associated with the provider device 130, the user communication component 104 may enable or otherwise manage a communication channel 160 between the requester device 120 and the provider device 130.

The communication component 104 can establish one or more communication channel 160 for individual client devices, where each communication channel 160 may utilize one or more networks, including network 150 (e.g., the Internet), as well as one or more cellular networks, telephone networks, data networks, and/or other networks.

In examples, the network computer system 100 can also implement a voice-assistant component 106. Depending on implementation, the voice-assistant component 106 can be implemented independent or, in conjunction with the communication component 104. Additionally, the voice-assistant component 106 can be implemented for either requesters (e.g., riders) or providers. Thus, while numerous examples are described in context of FIG. 1, which provide for the voice-assistant component 106 to be implemented with provider device 130, in variations, the voice-assistant component 106 can alternatively be implemented for use with the requester device 120.

In examples, the voice-assistant component 106 can be implemented in alternative design modes. In a first mode, the voice-assistant component 106 can trigger an output prompt for the provider, based on a predefined library of actions, as well as situational or contextual triggers which can cause the output prompt. In a second mode, the voice-assistant component 106, the voice-assistant component 106 can communicate with the respective user in a natural tone, using names and conversational dialogue. In a third mode, the voice-assistant component 106 can behave autonomously, with high-degree of accuracy with respect to interpreting the user (e.g., driver) intent, and with respect to prompting situational-specific actions from the respective user.

In examples, the voice-assistant component 106 can be implemented for individual users as a distributed component. Thus, for example, functional components may reside with the end user device (e.g., provider device 130) and with one or more servers of the network computer system 100.

Still further, in examples, the voice-assistant component 106 implements a state-machine, having multiple states. The voice-assistant component 106 can implement one of multiple states, which can include, for example, (i) a speaking state (e.g., provider device 130 displays visual representation of the voice command audio playback), (ii) a listening state (e.g., visual feedback that the microphone is capturing and isolating the speaker's voice), (iii) a loading state (e.g., time lag as the user's intent is determined), and (iv) an intent capture state (e.g., acknowledgement of successful intent of the requester being determined).

Figure 2:
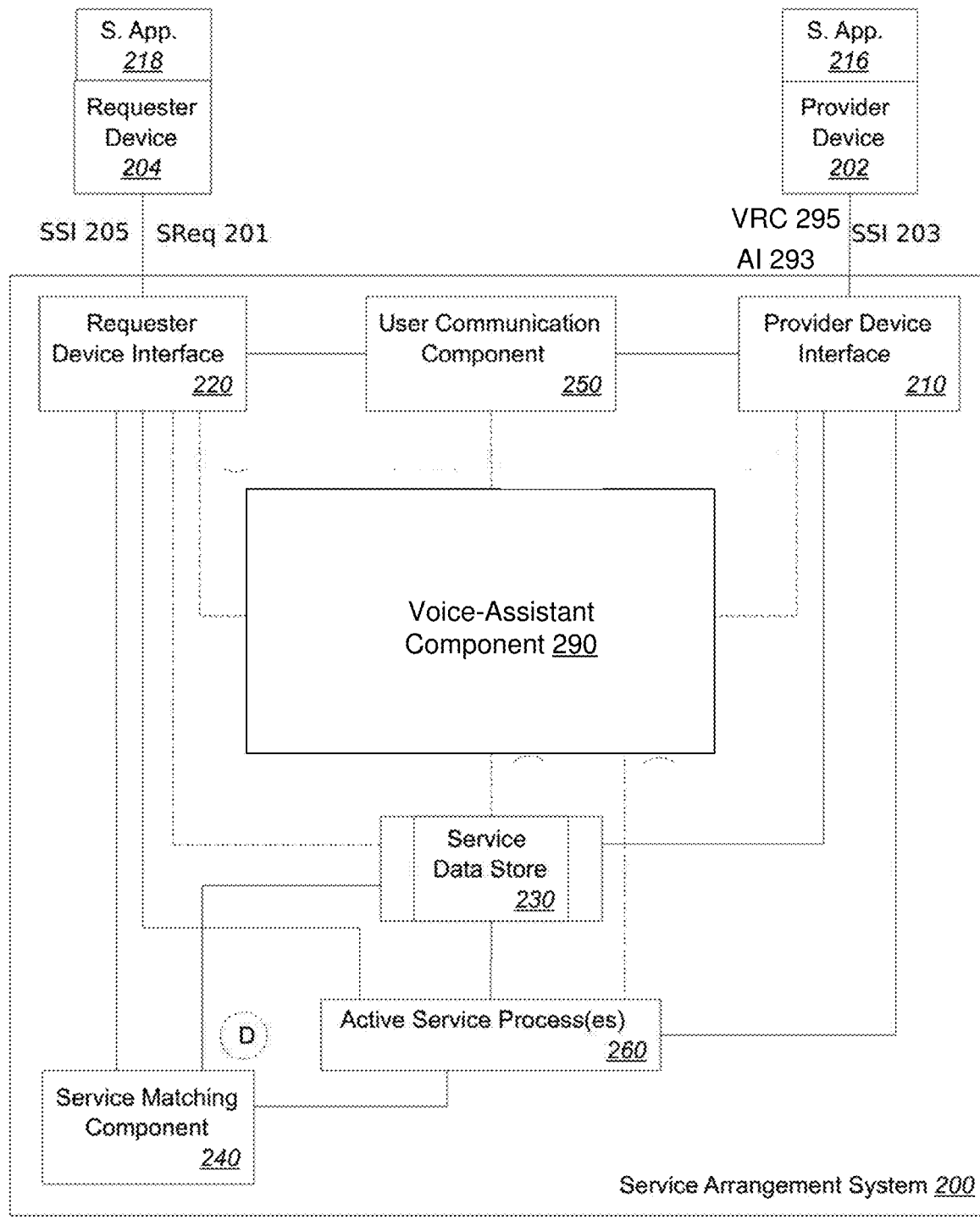
FIG. 2 illustrates an example of a service arrangement system which utilizes artificial voice-assistance for providers and/or requesters, in accordance with examples described herein.

FIG. 2 illustrates an example of a service arrangement system which utilizes artificial voice-assistance for providers and/or requesters. According to examples, a service arrangement system 200 may be implemented as a network service, using, for example, a network computer system 100 such as described in FIG. 1. In some examples, the service arrangement system 200 implements a network platform in connection with applications that run on mobile devices of the population of users. In variations, the types of services which may be arranged through the service arrangement system 200 may include human transport, deliveries, shipping, deliver, and other on-demand services. For a given geographic region, the users can include operators (or "service providers") of service vehicles, as well as requesters who receive a transport-related service. The service arrangement system 200 may include a provider device interface 210, a requester device interface 220, a service matching component 240, a user communication component 250, and a voice-assistance component 290.

The provider device interface 210 includes or performs processes that run on the network-side of the service arrangement system 200 to establish communication channels with individual devices of service providers. For example, the provider device interface 210 can establish secure sockets with different types of mobile devices. The service providers of the service arrangement system 200 can utilize these secure sockets when providing services using their respective vehicles. In some examples, the service providers operate mobile devices (represented in FIG. 2 by the provider device 202) on which a corresponding service application 216 runs. The service application 216 may correspond to a program (e.g., a set of instructions or code) that is downloaded and stored on the provider device 202. The service provider can launch the service application 216 on the provider device 202 in order to utilize the service arrangement system 200 to receive service requests, and the service provider may operate a service vehicle to fulfill assigned service requests. Among other functionality, the service application 216 can automate operations which include sending information (including service-specific information 203) to the service arrangement system 200 and receiving information from the service arrangement system 200 that facilitates providing the services to requesters.

Likewise, the requester device interface 220 includes or performs processes that run on the network-side of the service arrangement system 200 to establish communication channels with individual devices of requesters. The requesters may also operate mobile devices (represented in FIG. 2 by the requester device 204) on which a corresponding service application 218 runs. The service application 218 may correspond to a program (e.g., a set of instructions or code) that is downloaded and stored on the requester device 204. A requester can launch the service application 218 on the requester device 204 in order to utilize the service arrangement system 200. The requesters may operate respective service applications 218 to request transport-related services, such as human transport between a starting location (or pickup location) and a destination location (or drop-off). Among other functionality, the service application 216 can automate operations which include sending information (including service-specific information 205) to the service arrangement system 200 and receiving information from the service arrangement system 200 that facilitates requesting and receiving services provided by service providers.

In some examples, the provider device interface 210 and the requester device interface 220 can each include or use an application programming interface (API), such as an externally provider-facing API, to communicate data with the provider device 202 and requester devices 204, respectively. By providing the externally facing API, the service arrangement system 200 can establish secure communication channels via secure access channels over the network through any number of methods, such as web-based forms, programmatic access via RESTful APIs, Simple Object Access Protocol (SOAP), remote procedure call (RPC), scripting access, etc.

The requester device interface 220 sends and receives information from requester devices 204. For example, the requester device interface 220 may receive a service request 201 from a requester device 204, and service-specific information 205 that relates to the service request 201. The service-specific information 205 from the requester device 204 may include information that is generated for a specific service arrangement, such as the service request 201 that requests the specific service arrangement, requester-generated device data, requester-generated event information, communications sent from the requester device 204, and other information generated for a specific service arrangement. The service-specific information 205 may also include information generated by the requester device 204 that is not specifically generated for the particular service request 201 but which relates to the requester of the particular service request 201. For example, such information may include but is not limited to identification information for the requester device 204 or for a requester using the requester device 204, hardware or software specifications for requester device 204, and/or device data generated at the requester device 204 before the service request 201.

The provider device interface 210 sends and receives information from provider devices 202. For example, the provider device interface 220 may receive information indicating that a provider device 202 is active, send information regarding an assigned service request 201, and receive service specific-information 203 corresponding to the assigned service request 201. The service-specific information 203 from the provider device 202 may include information that is generated for a specific service arrangement (e.g., the service arrangement corresponding to the assigned service request 201), provider-generated device data, provider generated event information, communications sent from the provider device 202, and other information generated for the specific service arrangement. The service-specific information 203 may also include information generated by the provider device 202 that is not specifically generated for the particular service request 201 but relates to the service provider assigned to the particular service request 201. For example, such information may include identification information for the provider device 202 or for a service provider using the provider device 202, hardware or software specifications for provider device 202, device data generated at the provider device 202 before the service request 201 is assigned.

According to some examples, the provider device 202 initiates communications with the service arrangement system 200 using the service application 216 to indicate that the service provider associated with the provider device 202 is available. When a service provider is available, the service provider can receive and fulfill assigned service requests. The service arrangement system 200 may maintain information regarding available service providers and/or available provider devices 202. For example, a service state of a service provider can be available or unavailable, or another state which reads on availability (e.g., online, offline, busy, free, on route to starting location, on service route to destination location, etc.).

The service matching component 240 matches a service request 201 (and/or corresponding requester, requester device 204) with an available service provider (and/or corresponding provider device 202). In addition to the availability of the service provider, the service matching component 240 may determine a match based on one or more properties of the service provider and/or the requester, such as, for example, location, preferences, proximity, type of service, and/or context. Once the service provider 202 is matched to the service request 201, the service matching component 240 may change the service state associated with the selected service provider. For example, a service state of the service provider can be changed from available to unavailable, or from available to on route to the starting location associated with the service request.

After the service matching component 240 matches the service request between the requester device 204 and the provider device 202, the service arrangement system 200 manages and/or monitors the service arrangement. For example, the service arrangement system 200 may perform management and monitoring activities based on service-specific information from the provider device 202 and the requester device 204. The provider device interface 210 may receive provider-generated service-specific information 203 from the provider device, and the requester device interface 220 may receive requester-generated service-specific information 205 from the requester device 204. After the service arrangement system 200 receives the service-specific information 203-205 at the provider device interface 210 and the requester device interface 220, the service-specific information 203-205 may be stored (e.g., by updating the service data store 230) and/or further processed. For example, the service-specific information 203-205 may be processed by the service matching component 240, the voice-assistant component 290, and/or one or more active service processes 260 of the service arrangement system that are configured to monitor and/or manage the service request.

In some implementations, the service arrangement system 200 includes a service data store 230. The service data store 230 includes data that describes one or more service requests, such as service-specific information 203-205 for service request 201. The service data store 230 may include one or more tangible and/or virtual data storage locations, which may or may not be physically co-located. By way of example, the service data store 230 may include text or alphanumeric data maintained in memory and/or on disk. As another example, the data store can include a database maintained by a database server. The service data store 230 may include service request parameters, service-state information, event information, user information, prior communication information and other contextual information associated with one or more service requests such as service request 201.

The service-specific information in the service data store 230 may include provider-generated information (e.g., data generated at the provider device 202), requester-generated information (e.g., data generated at the requester device 204), and/or system-generated system (e.g., data generated at the service arrangement system 200). Storing data in the service data store 230 may include adding one or more new data records, updating existing data record/s, and/or appending one or more existing data records. For example, in response to receiving service-specific information 203 from the provider device 202, the provider device interface 210 may cause the service-specific information 203 (or information generated based on the service-specific information 203) to be stored in the service data store 230. Likewise, in response to receiving service-specific information 205 from the requester device 204, the requester device interface 220 may cause the service-specific information 205 (or information generated based on the service-specific information 205) to be stored in the service data store 230. Furthermore, in some embodiments, when service-specific information is generated by one or more components of the service arrangement system 200 (such as the service matching component 240, one or more active service processes 260, and/or the user communication component 250), the server-generated information may be stored in the service data store 230.

In examples, the voice-assistant component 290 can operate to generate voice response communications 295 to the provider device 202 and/or requester device 204. The voice response communications 295 can be generated or communicated through the respective service applications 216, 218. In some examples, the voice-assistant program 290 operates to facilitate provider activities. For example, upon the matching engine 240 matching the respective provider to an incoming service request 201, the voice-assistant program 290 can be triggered to generate a voice response communication 295 for the provider device (e.g., audio chime, audio invitation). The voice-assistant program 290 can further initiate a listening duration, during which the service application 216 monitors for audio input (e.g., via the device microphone), and communicates the audio input 293 back to the voice-assistant program 290. The voice-assistant program 290 can then make a determination of the user intent, and specifically, with respect to the invitation for the new service request, whether the provider wishes to accept or decline the new service request. If the provider accepts the new service request, the voice-assistant program 290 can generate additional voice response communications 295 to, for example, communicate the pickup location or other information about the service request 201.

Figure 3:
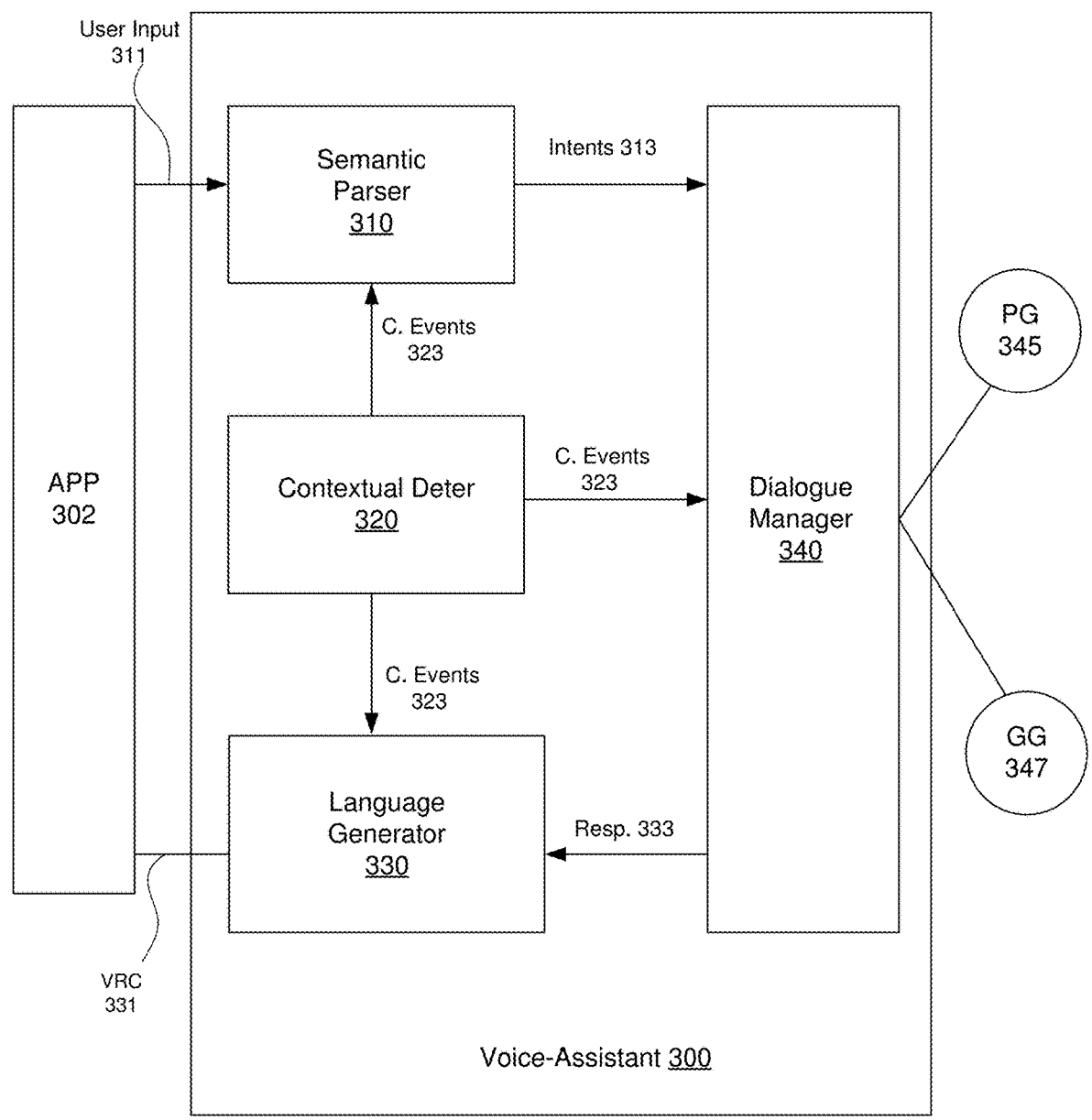
FIG. 3 illustrates a voice-assistant component or sub-system for use with on-demand services, according to one or more examples.

FIG. 3 illustrates a voice-assistant component or subsystem for use with on-demand services, according to one or more examples. In an example of FIG. 3, voice-assistant 300 includes a semantic parser 310, a contextual determination component 320, a language generator 330 and a dialogue manager 340. Each of the semantic parser 310, contextual determination component 320, language generator 330, and dialogue manager 340 can be implemented on the network computer system 100 (e.g., on a server), on the user's mobile computing device (e.g., provider device 130, 202), or as distributed functionality, with processes running on the network computer system 100 and on the user's mobile computing device.

The semantic parser 310 can receive user input 311, which can be in the form of voice or text. For example, the provider can provide a voice-input while operating his or her vehicle. The provider device 130, 202 can execute the respective service application 136, 216 to transmit the audio as it is received to the network computer system 100, or to transcribe the audio into text, before the text is transmitted to the network computer system 100. When the user input 311 is received, the semantic parser 310 identifies the intent and passes the intent along with one or more arguments (which may be present or missing).

The language generator 330 generates voice response communications 331 for the user. In examples, the language generator 330 can be equipped to mimic a human voice and personality, with personalization for the provider. In examples, the language generator 330 generates the output for the user that is responsive to an event, such as the provider's input, or to a contextual event (e.g., provider receiving new invitation for an assignment, or arriving at destination). The output can include the voice-response communication 331. In examples, the output can also include display content, such as display prompts that guide the user's next action or utterance (e.g., see FIG. 5F).

The dialogue manager 340 can receive (i) intents 313 from the semantic parser 310, or (ii) contextual events 321 from the contextual determination component 320, and generate responses 333 for the language generator 330. In turn, the language generator 330 can generate the output 331 based on an incoming response 333. The responses 333 can be determined from, for example, use of one or more graphs 345, 347. By way of example, a personal graph 345 can be used to determine static and dynamic user information relating to contextual events 321, where the contextual events can also be identified from the respective graph (e.g., common user actions, driving habits, milestones of significance for the provider, etc.). For example, the dialogue manager 340 can obtain information about a provider's current session, and further use the personal graph 345 in order to prompt the provider with respect to a milestone or alert. As another example, the global graph 347 can be used to process and determine voice-response communications that incorporate non-specific information (e.g., weather).

Example Voice Assistant Dialogues

Figures 4A, 4B, 4C:
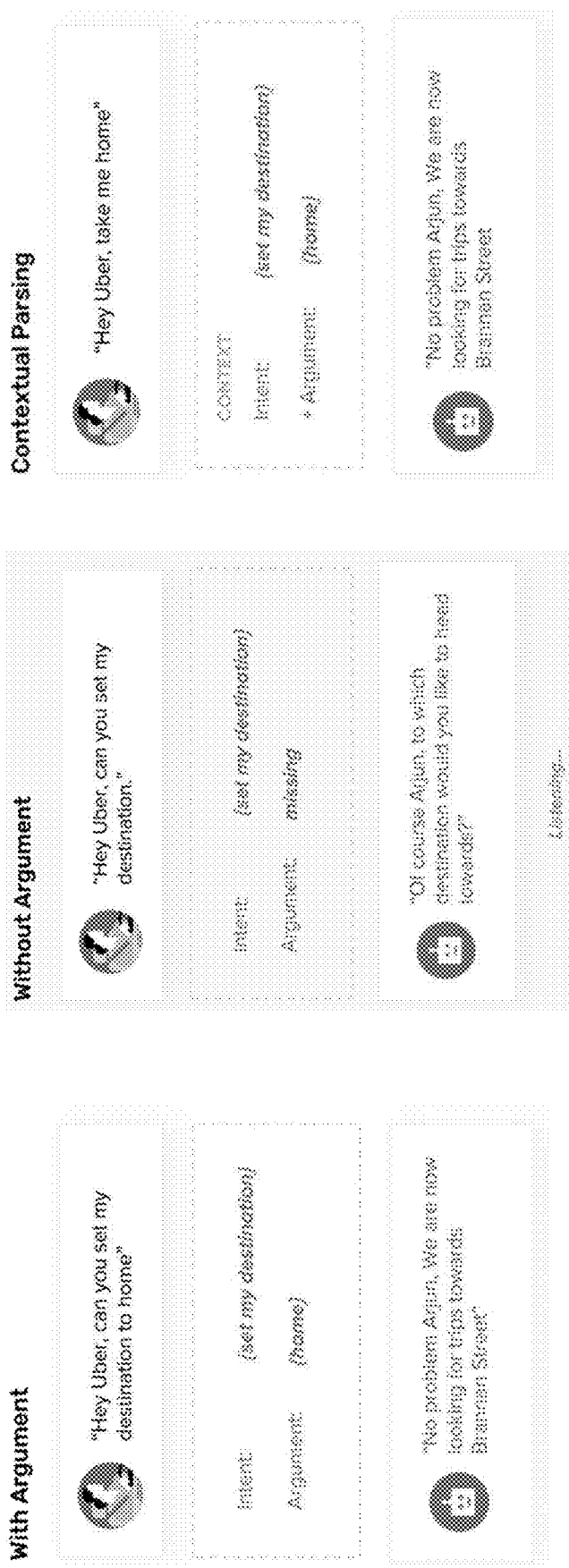
FIGS. 4A-4F illustrate example dialogues generated by the voice assistant for a service provider, in accordance with examples described herein.
Figures 4D, 4E:
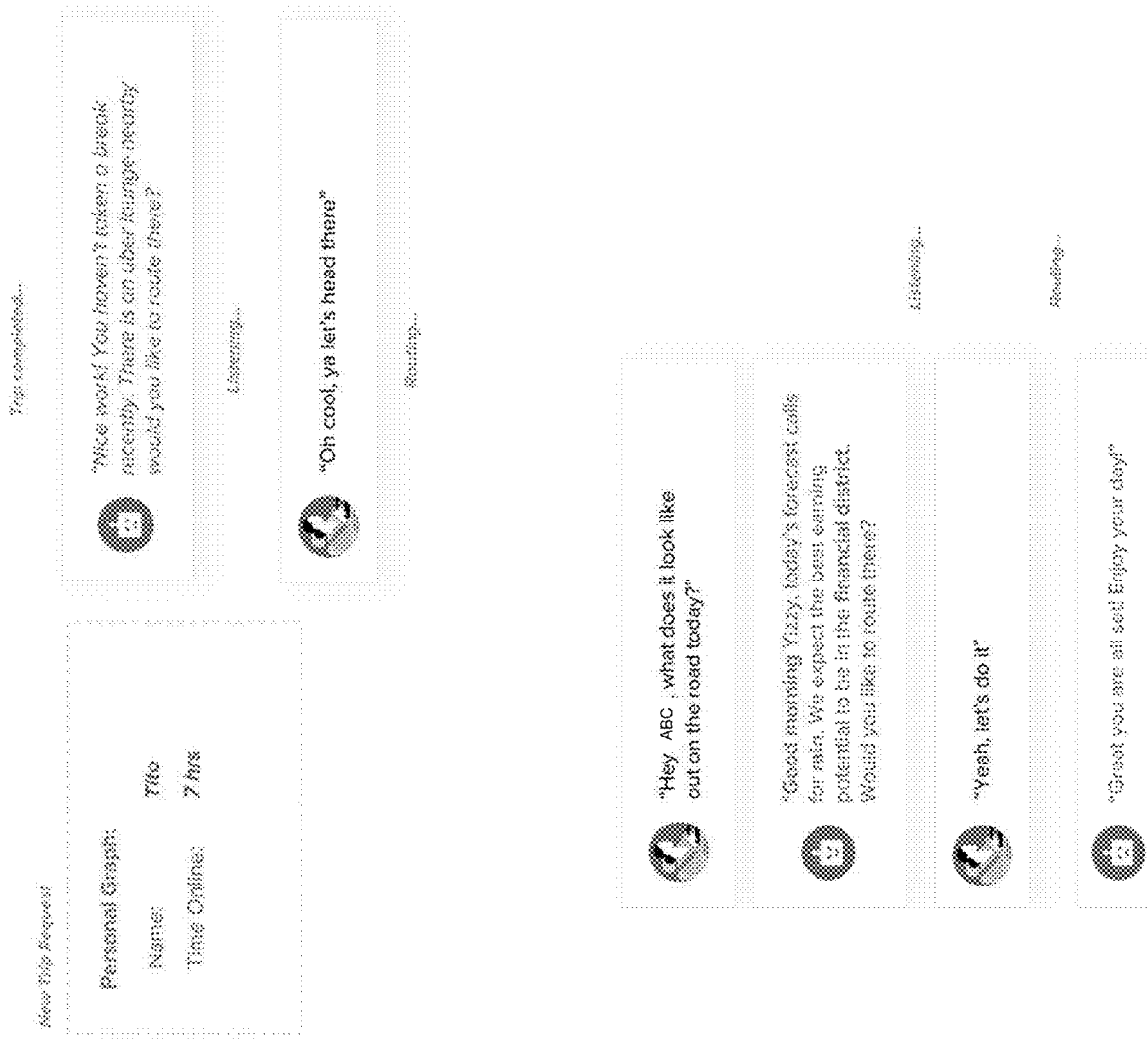
Figure 4F:
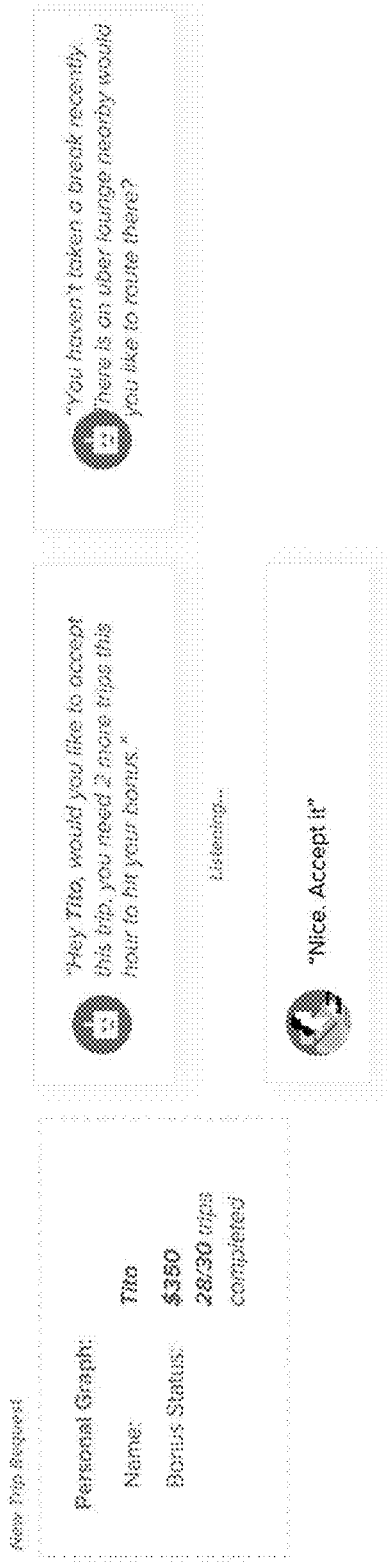

FIGS. 4A-4F illustrate example dialogues generated by the voice assistant for a service provider, in accordance with examples described herein. FIG. 4A illustrates a dialogue in which an intent is identified from the user input 311, along with an argument. FIG. 4B illustrates a dialogue in which an intent is identified from the user input 311, without an argument. FIG. 4C illustrates contextual parsing, where contextual parameters (e.g., as determined from the contextual determination component 320) are used to determine the intent and the argument. In each of the examples of FIG. 4A through 4C, the voice-assistant 300 generates a voice-response communication that is responsive to the particular input, and specifically, to the intent and argument (if present). FIG. 4D illustrates a dialogue that utilizes a contextual determination (e.g., provider has been working 7 consecutive hours, generating a contextual trigger), such as can be made by the contextual determination component 320. The dialogue manager 340 can use the personal graph 345 to generate a voice-response communication that is responsive to the user's session history. Additionally, the voice-response communication can note the user's recent session history. FIG. 4E illustrates a dialogue that utilizes the global graph 347 to generate, for example, a voice-response communication to the provider's input. The global graph can, for example, utilize non-specific provider information. FIG. 4F illustrate an example of a dialogue which utilize personal graphs 345 of the providers. The voice-response communications can generate, for example, prompts for the providers to take action, recommendations for the providers, and/or interactions where the provider can perform a function (e.g., accept a ride) without the use of his or her hands.

Figure 4G:
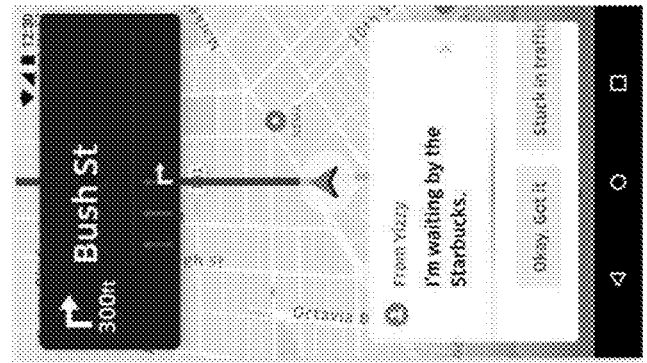
FIG. 4G illustrates a user-interface that can be generated by the service application.

FIG. 4G illustrates a user-interface that can be generated by the service application. The user interface can be generated along with, or in response to a voice-communication response from the voice assistant component 300. The user-interface can include actions, or voice prompts for the user. In the case of the provider, for example, the provider can be prompted to say one of two options. The provider's response can thus be made more recognizable to the processing resources of the device and system, enabling better recognition in the uncontrolled environment of the vehicle. The prompts can remain persistent until timed out, or until an utterance is heard from the driver.

Methodology

Figure 5A:
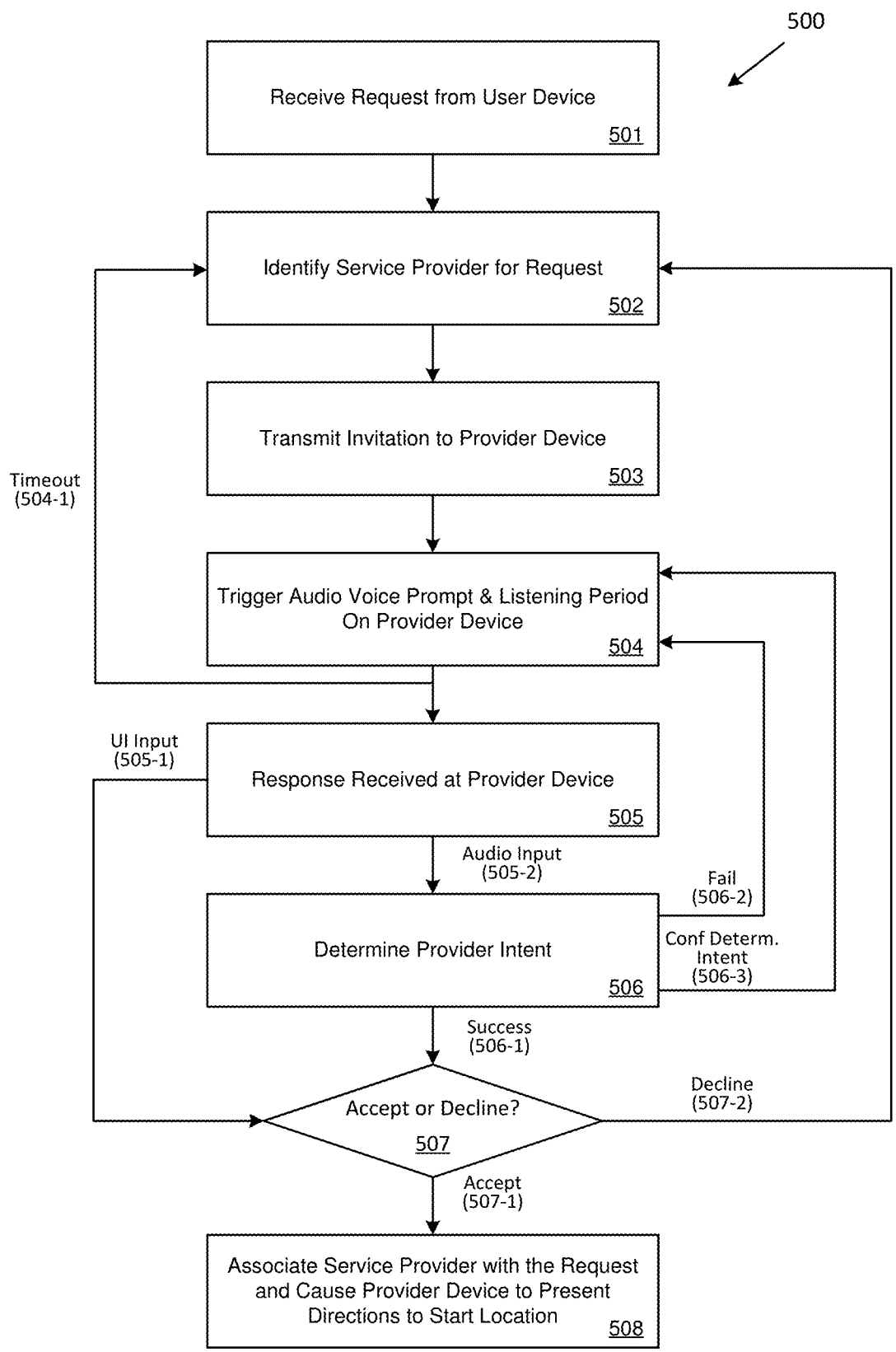
FIGS. 5A and 5B are flowcharts illustrating example methods for generating voice response communications for a service provider in connection with a network service, in accordance with examples described herein.
Figure 5B:
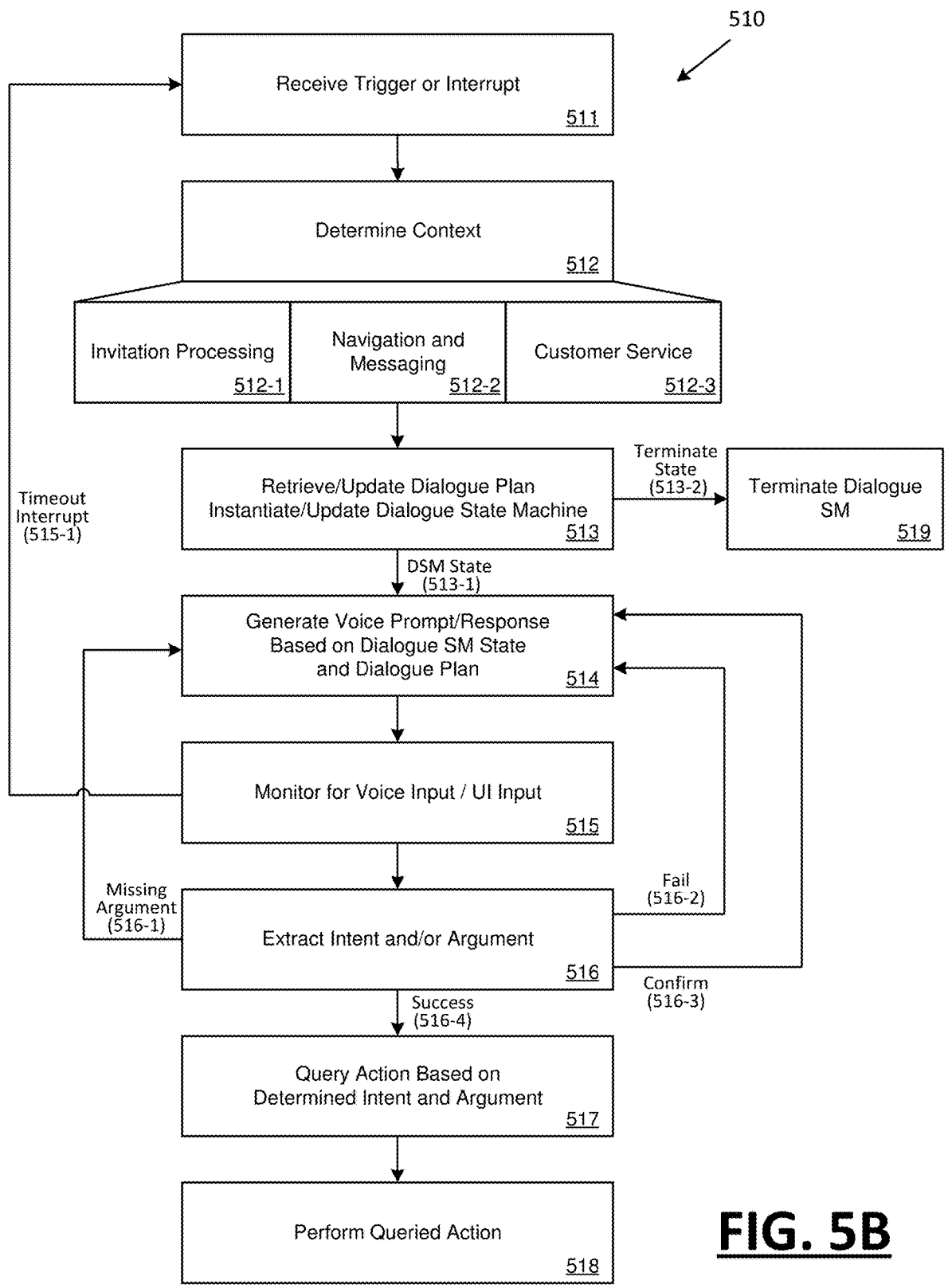

FIGS. 5A and 5B are flowcharts illustrating example methods for generating voice response communications for a service provider in connection with a network service, in accordance with examples described herein. In the below discussions of FIG. 4, reference may be made to FIGS. 1-4H. For instance, the example methods illustrated and described with respect to FIGS. 5A and 5B can be performed by a computer system such as the network computer system 100 illustrated and described with respect to FIG. 1.

Referring to FIG. 5A, flowchart 500 illustrates an exemplary method of generating voice prompts and responding to provider voice input in association with the handling of a request for a network service (e.g., an on-demand transport service). The network computer system can receive, over a network (e.g., the Internet) from a user device of a user, a set of request data corresponding to a request for the network service (501). The received set of request data can include an indication of a start location for the user (e.g., a location at which the user is rendezvous with a service provider identified to fulfill the request). The start location can be automatically determined by the user device (e.g., via a user application executing on the user device for interacting with the network service) based on location data generated by one or more geo-aware resources (e.g., GPS or GLONASS receivers, etc.) of the user device. The start location can also be inputted by the user by interacting with the user application. For instance, the user can input the start location via a map interface of the user application. Alternatively, the user can input the start location by inputting an address or landmark name.

In response to receiving the request, the network computer system can identify a suitable service provider to fulfill the request for the network service (502). The service provider can be identified based on its current location and/or a provider status. The provider status can be associated with the service provider indicating, for example, a status of the service provider with respect to the network service (e.g., available, offline, en-route, occupied, etc.). The network computer system can monitor the locations and statuses of a pool of service providers within a geographic region by periodically or continuously receiving location data and/or status information from provider devices operated by the service providers. In identifying a suitable service provider to fulfill the received request from the user, the network system can identify service providers located within a predetermined distance (or within a predetermined travel time away) from the start location(s) and have a provider status indicating availability to accept an invitation to fulfill the service request. In addition, the network system can identify a service provider who is contemporaneously providing services to a location near the start location indicated by the request, even though that service provider would otherwise be determined to be unavailable (e.g., currently occupied but dropping off a passenger within a predetermined amount of time at a location that is within a predetermined distance of the start location).

In response to identifying the service provider for the request, the network computer system can transmit a set of invitation data corresponding to an invitation to the provider device (503). The invitation can cause the provider device to display a user interface for accepting or declining the invitation. The user interface displayed on the provider device can include, for example, one or more user interface features to enable the service provider to accept or decline the invitation using a touch screen of the provider device (e.g., an "Accept" user interface feature and a "Decline" user interface feature).

The provider device of the identified service provider can further be triggered to present a first audio voice prompt that corresponds to the invitation to the service provider to fulfill the request from the user (504). The first audio voice prompt can be presented by the provider device contemporaneously with the user interface displayed in response to receiving the set of invitation data. Depending on the implementation, the first voice prompt can be triggered on the provider device in response to receiving the set of invitation data transmitted by the network computer system or can be triggered in response to receiving a first set of voice prompt data transmitted by the network computer system. In addition to triggering the presentation of the first voice prompt, the network system can further trigger the provider device to initiate a listening period during which the provider device monitors for a first audio input from the service provider. In some variations, the initiation of the listening period can be preceded by an audio tune (e.g., an audio tune to notify the service provider that the listening period is about to be initiated).

At step 505, a provider input in response to the invitation is received at the provider device. The response can be either an input received via the user interface displayed on the user device (505-1) (e.g., via an "Accept" user interface feature or a "Decline" user interface feature) or as an audio input recorded by one or more microphones of the user device (505-2). In response to a user interface response, the provider device can terminate the listening period for responding to the first audio voice prompt. In some implementations, the provider application executing on the provider device can determine that a response has been received via the user interface and can terminate the listening period in response. In other implementations, the network computer system can terminate the listening period in response to receiving the user interface response. In addition, the provider device (and/or the network computer system) can terminate the listening period in response to capturing an audio input from the service provider. Furthermore, the listening period (and/or a response period associated with the invitation) can expire (timeout 504-1) without the provider device having received either the user interface input or the first audio input from the service provider. In one implementation, as illustrated in FIG. 5A, upon the timeout 504-1, the network computer system can automatically re-perform service provider identification to identify another service provider to fulfill the request from the user. In other implementations, the provider device can re-present the user interface feature for accepting or declining the invitation and can re-perform step 504 including presenting a second audio voice prompt (e.g., "I did not hear you." or "Are you there?") before initiating another listening period for the service provider to provide an input with respect to accepting or declining the invitation (e.g., via the user interface or via an audio input). In yet another implementation, both approaches could be taken concurrently, the service provider could be prompted again for an input while the network computer system can begin identifying another suitable service provider. If the service provider accepts the invitation prior to another service provider being identified, the initially-identified service provider can fulfill the request.

With respect to the audio input 505-2, the provider device can transmit, over the network to the network computer system, a set of response data corresponding to the audio input 505-2 recorded by the provider device. The network computer system can determine, based on the received set of response data, a provider intent associated with the audio input, the provider intent corresponding to whether to service provider accepts or rejects the invitation (506). If the provider intent is successfully determined (506-1), the network computer system proceeds to step 507. If the provider intent cannot be determined (506-2), the provider device can be triggered to present another audio voice prompt (504) seeking the service provider's input and another listening period can be triggered to capture an audio input. In variations, in determining the intent of the service provider, the network computer system can determine a confidence score associated with the audio input. The confidence score can be determined based on one or more keywords recognized in the captured audio input. For instance, a dialogue flow can be predetermined for the context of handling a response to an invitation to fulfill a service request. In such predetermined dialogue flow, a set of predefined keywords can be associated with a plurality of possible intents of the service provider. For example, in this context, keywords such as "Yes," "Accept," and/or "OK" can be associated with the intent of accepting the invitation and keywords such as "No" and/or "Decline" can be associated with the intent of declining the invitation. In some implementations, whether the provider intent can be successfully determined (506-1) or not (506-2) can be based on whether the confidence score is above or below a threshold value.

In addition or as an alternative, the network computer system can cause the provider device to perform a series of functions to prompt the service provider to confirm a determined intent (506-3). The network computer system can do so in response to the confidence score associated with the determined intent being between a high threshold value and below a low threshold value. In such an implementation, if the confidence score is above the high threshold value, the network computer system can function in accordance with step 506-1 (successful determination of intent). And if the confidence score is below the low threshold value, the network computer system can function in accordance with step 506-2 (failure in determining intent). If the confidence score is between the threshold values, the network system can cause the provider device to perform functions to prompt the service provider to confirm the determined intent (506-3). To do so, the provider device can present another audio prompt that includes an audio narration of the determined intent (e.g., "I think you said to accept the invitation."). The provider device can initiate another listening period to record another audio input from the service provider to confirm or clarify the determined intent. As an alternative, instead of requiring the service provider to provide a spoken confirmation, the confirmation of a determined intent (506-3) can comprise a voice prompt that speaks aloud the determined intent of the service provider and a user interface feature (e.g., a selectable "Dismiss" or "Cancel" user interface feature) for canceling the pending action from being taken as a result of the determined intent. For instance, for a determined intent of accepting an invitation with an associated confidence score below a high threshold but above a low threshold, a voice prompt can be presented stating, for example, "Accepting the invitation . . . " If the service provider does not select the "Dismiss" or "Cancel" with a given time window, the network computer system will perform actions in accordance with the determined intent (e.g., step 508).

In response to the identified service provider accepting the invitation (507-1) (either via an accept intent successfully determined at step 506 or via a user interface input 505-1), the network computer system can associate the service provider with the request (508). For example, the network computer system can create a record for the instance of the network service being rendered by the service provider for the user in response to the request. The provider device can further present, within provider application or via a third-party application, navigation directions (e.g., turn-by-turn navigation) to the start location indicated by the request of the user. In some implementations, the presentation of the navigation directions can be preceded by an audio tune to signal to the service provider that an action (e.g., the presentation of the navigation directions) will take place within the provider application. In response to the identified service provider declining the invitation (507-2) (either via a decline intent successfully determined at step 506 or via a user interface input 505-1), the network computer system can re-perform step 502 (and the subsequent steps of method 500) and identify another service provider to fulfill the received request.

After step 508, the voice assistant of the network system can be made available (e.g., via an audible "hot word" monitored for by the provider device, a selectable user interface feature presented on the provider device, etc.) to continue providing voice assistant functionalities for the service provider as the service provider proceeds to the rendezvous point with the requesting user. For instance, the service provider can utilize the voice assistant to receive messages from the requesting user (e.g., the voice assistant can read aloud messages from the requesting user) and respond to those messages. As another example, the service provider can further utilize the voice assistant to provide navigation directions without physically interacting with the touch screen of the service provider device.

Referring to FIG. 5B, flowchart 510 illustrates an exemplary method 510 of instantiating a voice-assistant dialogue in connection with a network service. The voice-assistant sub-system of the network computer system can receive a trigger or an interrupt (511). A trigger or an interrupt can correspond to an occurrence or detection of an event associated with the network service (e.g., receipt of a request for service from a user, identification of a service provider for the request, cancellation of the request by the user, etc.), an input received from a service provider via a provider application (e.g., a voice input), or a timeout associated with a waiting period for input (e.g., an audio waiting period timeout). In the example voice assistant dialogue illustrated in FIG. 4A, the trigger or interrupt for the illustrated interaction is the receipt of the voice input 401 from the service provider "can you set my destination to home." Similarly, in FIG. 4B, the trigger or interrupt is the receipt of the voice input 411 from the service provider. As another example, the trigger for the example voice assistant dialogue illustrated in FIG. 4D is the completion 432 of the rendering of services by the service provider for a particular user.

The trigger or interrupt can also be automatically generated by the network computer system. For instance, the network computer system can continuously monitor parameters associated with the service provider (e.g., current length of time active in fulfilling service requests, number of instances of the network service fulfilled within a particular time period by the service provider, etc.) and can initiate voice-assistant dialogues or update existing dialogue plans (e.g., currently occurring dialogue or future dialogue) in response to detecting that one or more of the monitored parameters exceeds or falls below one or more threshold values. For instance, the network computer system (or the voice-assistant subsystem) can detect that the service provider has been continuously providing services for 7 hours. In response, a trigger can be automatically generated to initiate a voice-assistant dialogue informing the service provider that he or she should take a break.

In response to receiving the trigger or interrupt, the voice-assistant subsystem can determine the context of a potential voice assistant dialogue (512). The context can be determined based on a current status of the provider (e.g., available, en-route to start location, currently providing services, etc.) and/or the trigger or interrupt received. For instance, referring to FIG. 5A, the trigger or interrupt for a voice-assistant dialogue presented in the example method illustrated in FIG. 5A can be the identification of a service provider for a received request for service. In this example, the context can be determined to be invitation processing (512-1) based on the interrupt or trigger received. Other example contexts determined by the network computer system at step 512 can include navigation and messaging (512-2) (e.g., requesting the service provider application to provide navigation directions to a particular destination or compose a message to a user of the network service) and customer service (512-3) (e.g., requesting to be connected to a customer service representative of the network service in connection with an on-going service or a recently completed service). As an example, the voice-assistant subsystem can determine the context to be customer service 512-3 based on a determination that the service provider is currently providing services for a user or recently having completed services for a user and the trigger or interrupt corresponding to the service provider requesting aid.

Based on the determined context and/or the trigger or interrupt, the voice-assistant subsystem can retrieve a dialogue plan and instantiate a dialogue state machine (513). For instance, based on the determined context of invitation processing, the voice-assistant subsystem can retrieve a dialogue plan that is specifically designed for the determined context of interpreting provider utterances in accepting or declining invitations. The voice-assistant subsystem can also update an existing dialogue plan or an existing dialogue state machine in response to a received trigger or interrupt. As one example, a service provider can be interacting with the voice-assistant to accept or decline an invitation to fulfill a request for service received from a user. During this interaction, a trigger or an interrupt can be received by the voice-assistant sub-system that corresponds to the requesting user canceling his or her request for service. In such a scenario, the voice-assistant sub-system can update the existing dialogue state machine to a terminate state (513-2) and cause the dialogue state machine and the voice-assistant dialogue to be terminated (519). As another example, a received trigger or interrupt can correspond to a non-voice input (e.g., an input received via the user interface of the service provider application) and can terminate a dialogue. For example, rather than saying "accept" to an invitation processing dialogue, the service provider can provide an input via the touch screen of the provider device.

Based on the current dialogue state machine state and the retrieved dialogue plan for the context, the voice-assistant subsystem can generate a voice prompt (or response) to be presented by the service provider device (514). If the dialogue requires (e.g., based on the dialogue state machine state) an input from the service provider, the provider device can be caused to monitor for voice or user interface input (e.g., during a listening period) (515).

In response to receiving a voice input, the voice-assistant subsystem can determine or extract an intent and/or an argument from the voice input (516). If the intent requires an argument but none is extracted from the voice input (516-1), the voice-assistant subsystem can provide another voice prompt to ask the service provider to provide the missing argument. As an example, the service provider can ask the voice-assistant system to provide navigation directions. In this case, if the argument (e.g., destination for the navigation directions) is determined to be missing, the voice-assistant subsystem can prompt the service provider to input the missing argument. If the intent determination failed (516-2) (e.g., a confidence score below a threshold value associated with the determined intent, or the intent could not be determined), the voice-assistant subsystem can also prompt the service provider to clarify his or her voice input. The voice-assistant subsystem can further confirm the determined intent and/or argument (516-3) in a manner similar to that described with respect to FIG. 5A (e.g., 506-3).

If the intent determination is successful (516-4), the voice-assistant subsystem can query the action to be performed based on the determined intent and/or argument (517). The actions that are available to be queried can be set forth by the dialogue plan and/or the dialogue state machine that is instantiated. At step 518, the queried action is performed by the network computer system.

Figure 5C:
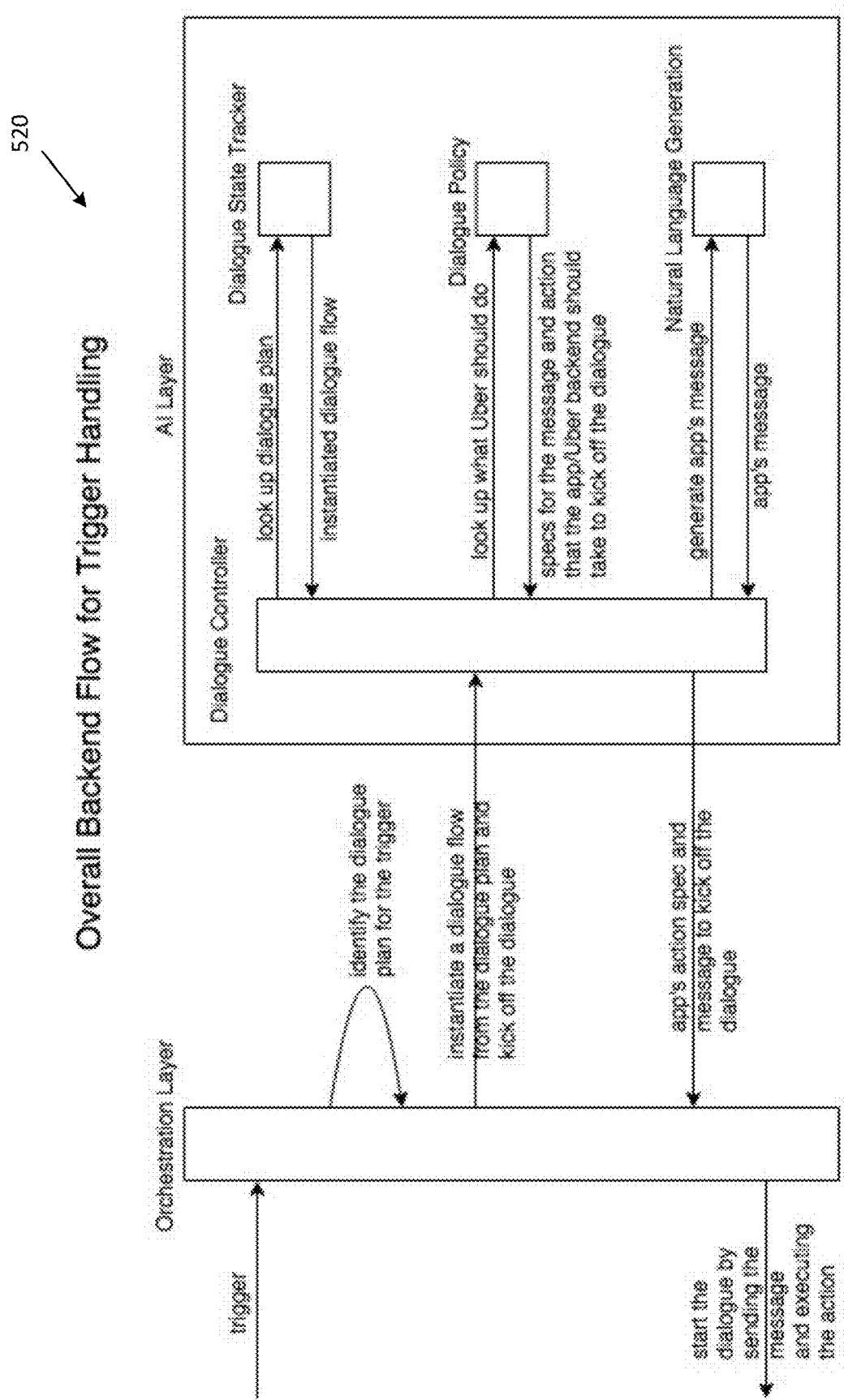
FIGS. 5C to 5K illustrates example backend communication handling sub-systems and flow charts relating to their operations, in accordance with examples described herein.

FIG. 5C illustrates a backend communication handling sub-system 520 which implements a flow that is responsive to a human user (e.g., provider) speaking to a service application (e.g., provider application 130, 216). The communication handling sub-system 510 can, for example, be implemented by the dialogue manager 340 as a response to a user input. The communication handling sub-system 520 generates an appropriate next message (or voice-communication response) for output on the service application, along with an appropriate action.

Figure 5D:
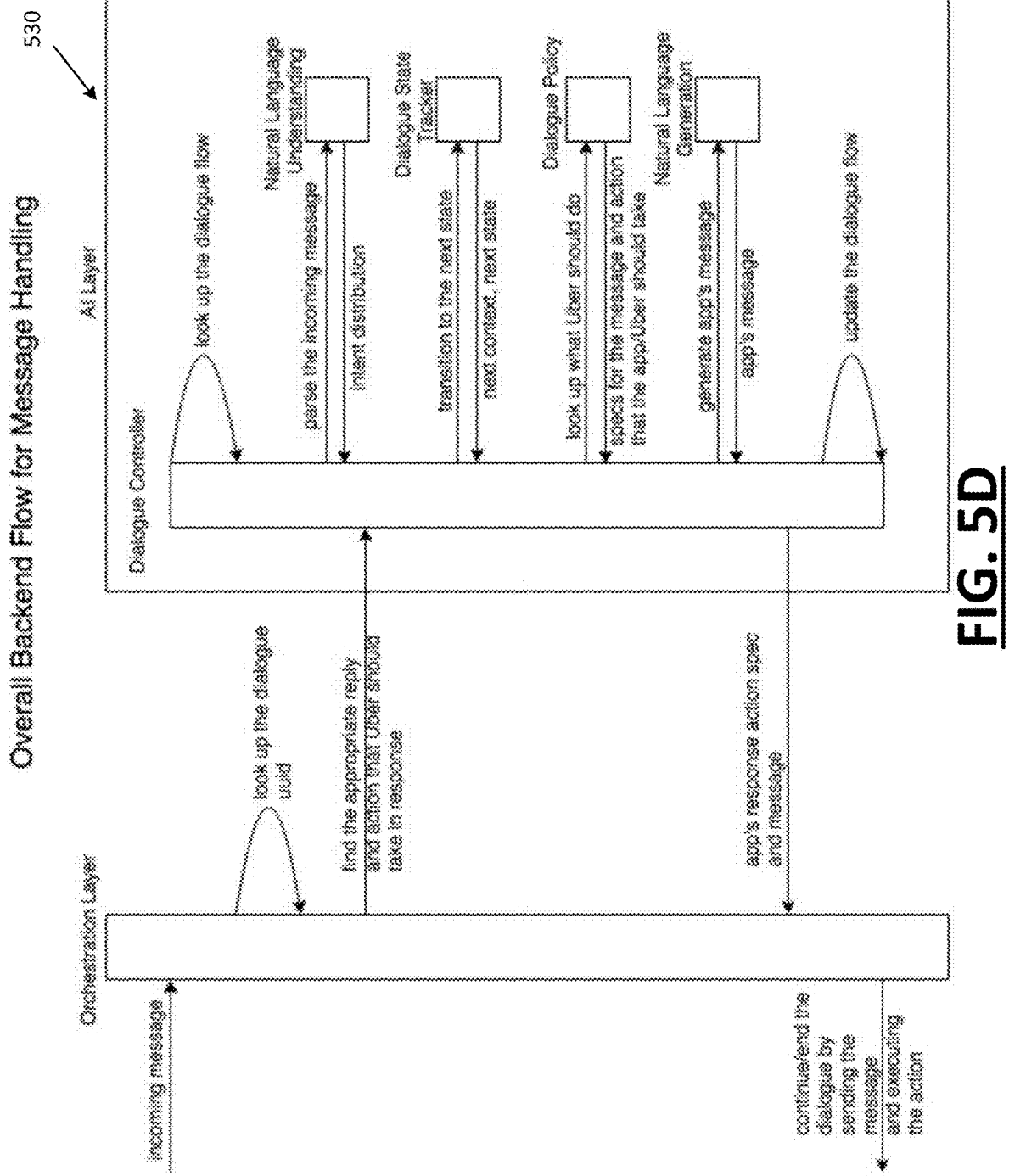

In FIG. 5D, the communication handling sub-system 530 implements a flow as a response to an interrupt (e.g., a client or backend event during a conversation that is not a dialogue utterance, but has implications for a conversation). The interrupt handling can change the dialogue state and lead the interaction client (app, web client, or autonomous vehicle) to speak to the user.

Figure 5E:
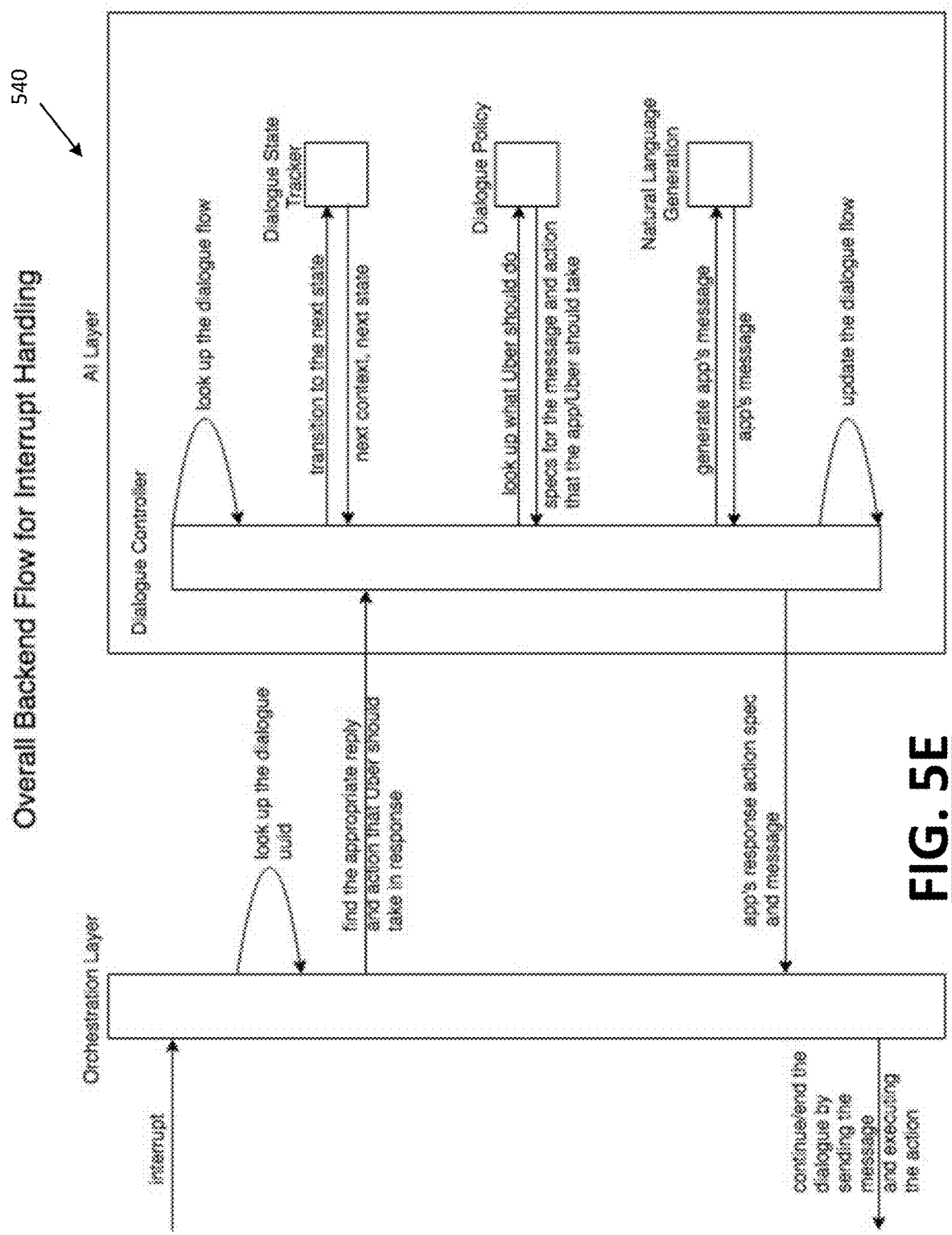

FIG. 5E illustrates use of an orchestration layer and artificial intelligence layer by the voice-assistant 300. An orchestration layer is responsible for voice interaction registration, handling requests from the communication channel, forwarding requests to the AI layer for intent classification and dialogue management, instantiating a dialogue flow when a trigger is hit, and ending a dialogue. The AI layer, on the other hand, handles the language understanding, dialogue management, dialogue policy, language generation, and backend action execution. In examples, the AI layer can incorporate predefined rules. In variations, the decision makings of AI layer can be implemented through machine learning models. Specifically, in NLU, AI layer can use, for example, deep learning classification models to detect user intents, and further to sequence tagging models to detect slot values. Once the AI layer understands the dialogue states, certain action can to be executed to guide the user toward fulfilling the task. Such a policy mapping from state to action can also be learned using reinforcement learning approaches such as deep-Q learning. Additionally, the AI layer can call models for intent classification, slot filling and policy learning, including ASR or NLG.

Figure 5F:
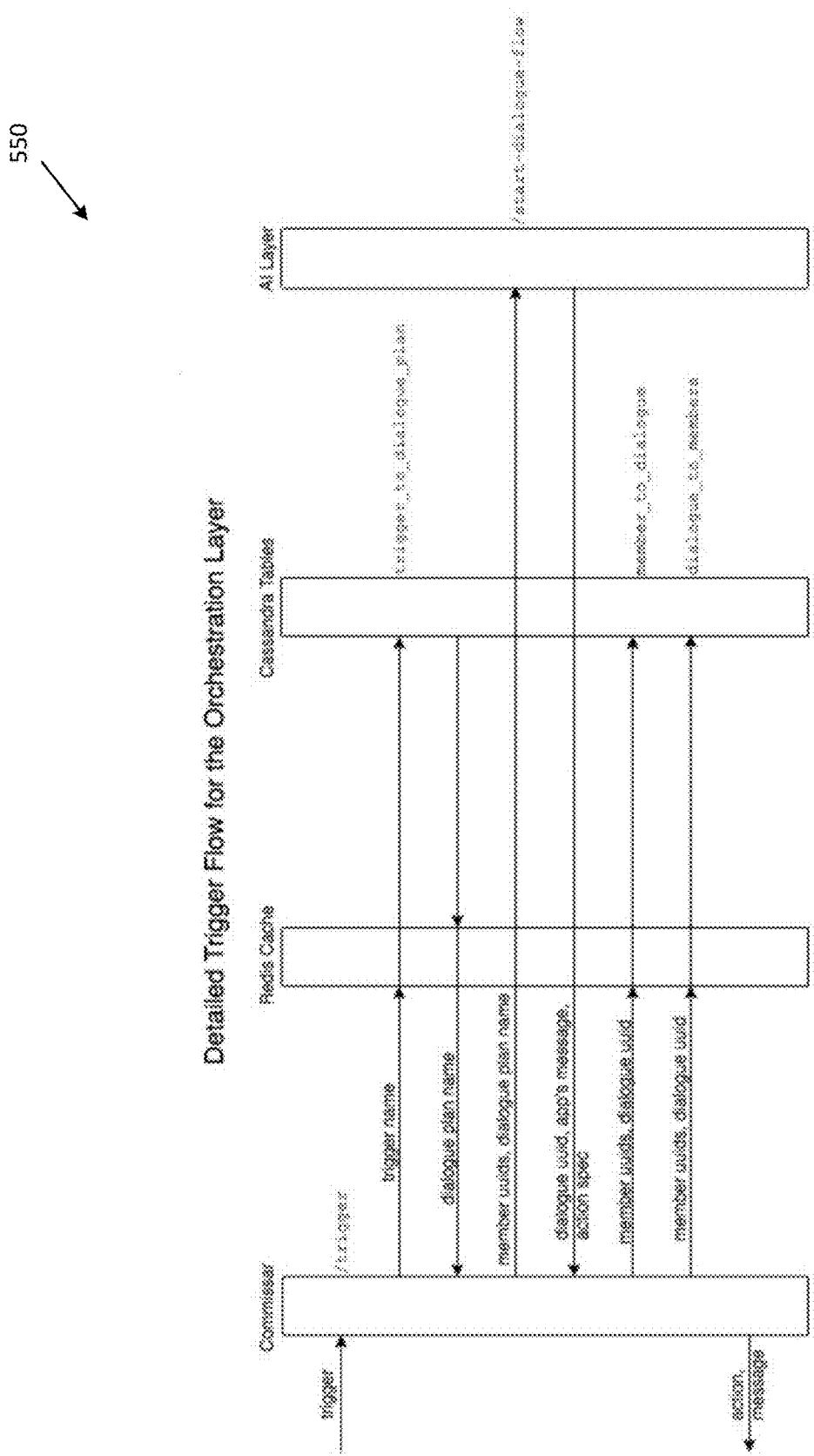
Figure 5G:
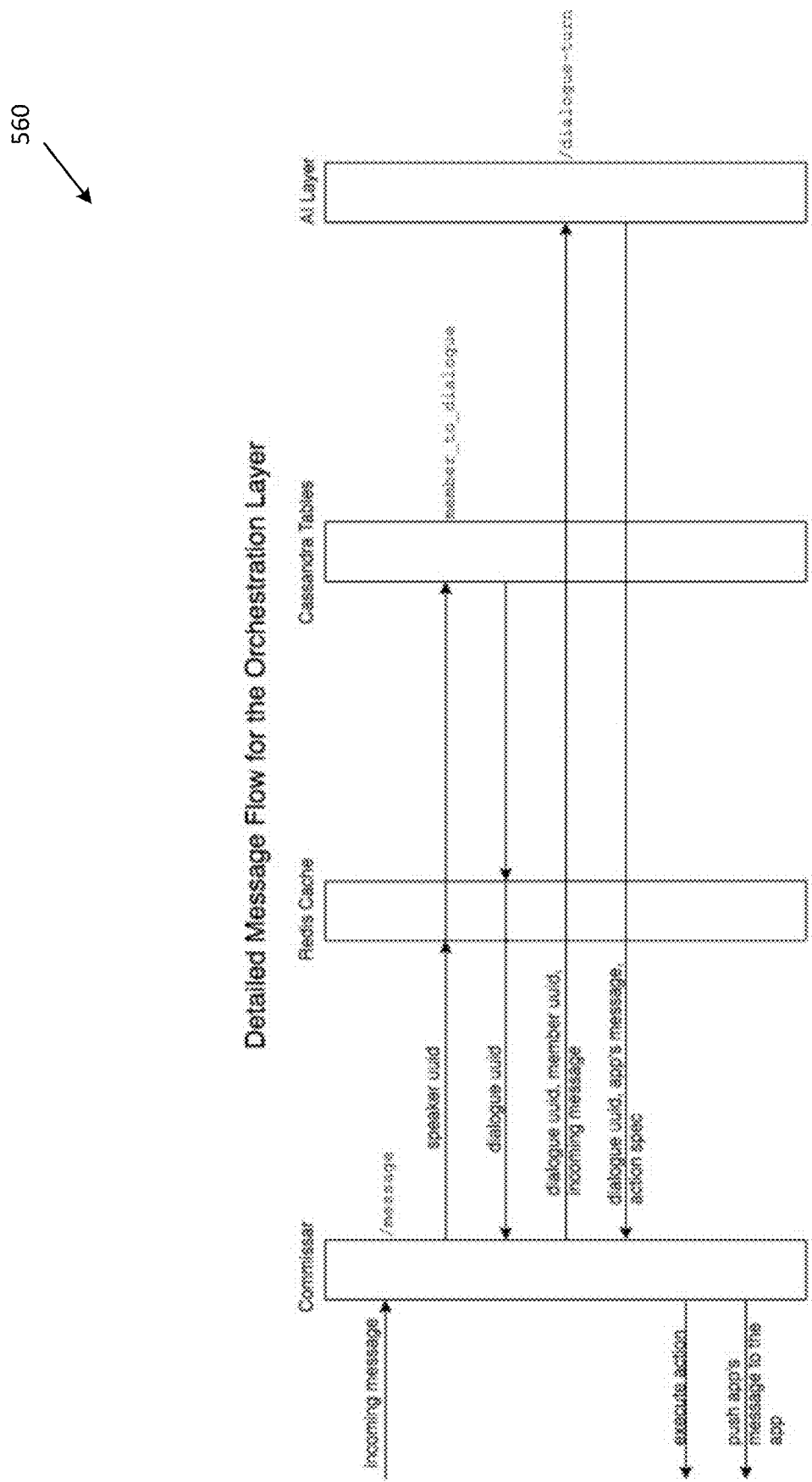

FIG. 5F (for communication handling) and FIG. 5G (for interrupt handling) illustrate the orchestration layer implemented as an HTTP service. The orchestration layer can support both synchronous fetching of data when the dialogue begins (receives a trigger) and when a message/interrupt is received, as well as asynchronous fetching of data (e.g. fetch information about the driver one he/she goes online and store it in a Cassandra table(s) for easy access when the driver starts a dialogue later).

In examples, the voice-assistant 300 can determine, from the input, the intent name and the relevant parameters extracted from the message. In some examples, a rule-based intent classification: semantic frame matching with slot filling. In such examples, context will determine the candidate intents (could be all intents) as well as which classifier to apply. Neural network models, classification algorithms, or classifiers can also be employed to determine intents, and to determine arguments.

In examples, the voice-assistant 300 can be implemented as a finite state machine with an open-ended context that defines all of the states for a scenario. At any moment during a dialogue, the dialogue is in one of the states. Each state starts with the NL interaction client possibly speaking an utterance to the user and then waits for either a response or an interrupt which would lead to the transition to the next state. Specifically, each state can be associated with a corresponding action and possibly a response message (or template) for the NL interaction client device to use. Based on parameters in the context, the state also specifies which intent classifier model to use to parse the user's utterance. There are also transitions from one state to another. The outgoing transitions at each state form a probability distribution P(S$_i$|I; Sj, C) where I is a meaning representation of the user's current utterance (e.g., intent will be used as the meaning representation), S$_i$ and S$_j$ are states, and C is the current context of the conversation. Each transition distribution has its own model in the AI layer, though potentially, the models for some transitions can be shared. The probabilities will be either zero or one, so the policy is deterministic. In some implementations, the context may allow us to expand the expressive power of the policy without adding too many states, making the FSM effectively a Turing Machine. From a practical perspective, this makes the dialogue plan easier to reason about for the dialogue designer.

A dialogue plan can also be implemented to swap in/out increasingly powerful intent classifiers without changing the flow of the conversation. Fully specifying the dialog policy also gives us control over the scenario. Once the dialog policies for a lot of scenarios have been registered with the platform, transitions can be added from one policy to another in order to have better flow between different scenarios.

With further reference to an example of FIG. 3, the 300 can utilize a service application 302 (e.g., such as service application 216, for provider device 202). In an example, the service application 302 can be triggered to activate a voice-assistant, where the trigger can be provided by, for example, a user input or contextual event.

Figure 5H:
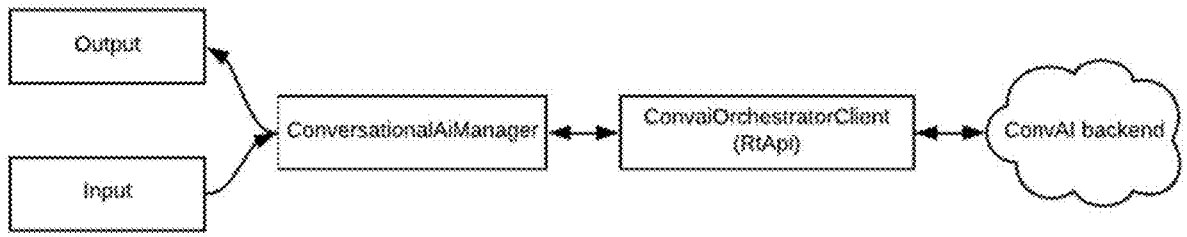
Figure 5I:
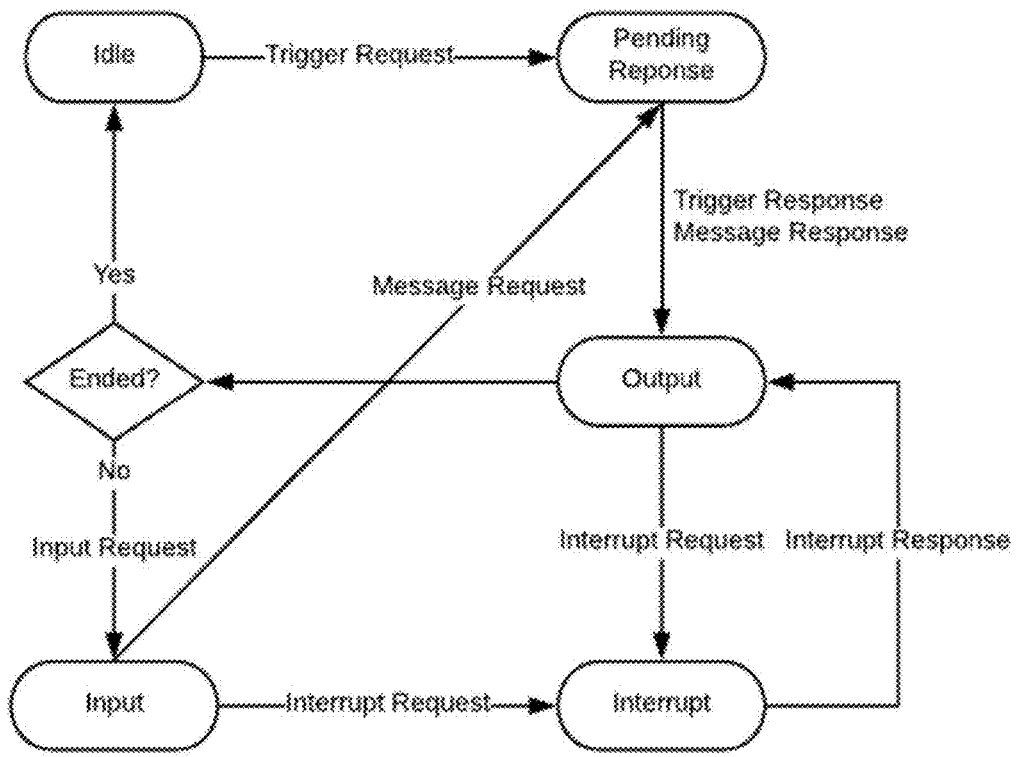
Figure 5J:
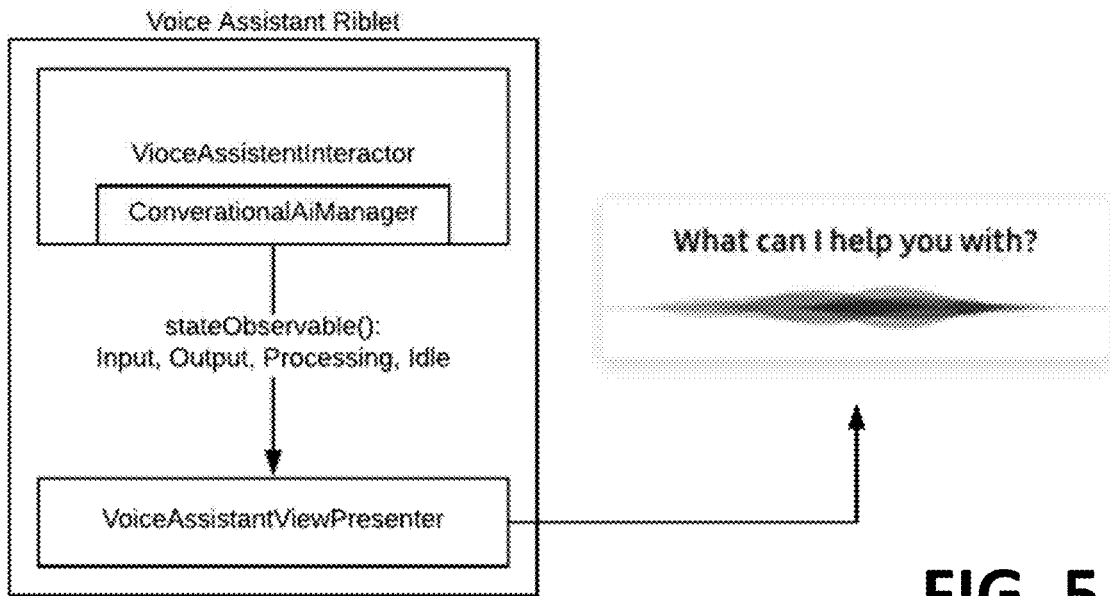
Figure 5K:
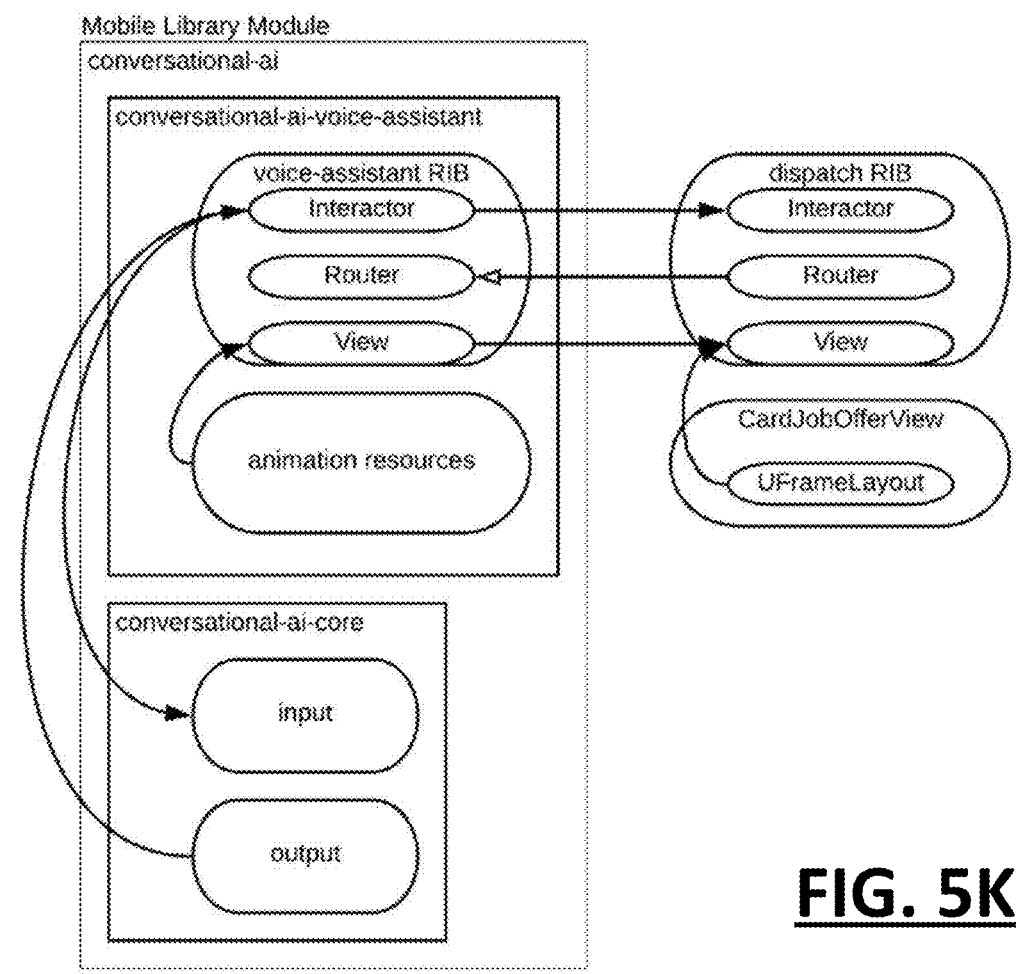

With reference to FIG. 5H, the service application 302 can implement an Input, Output, network layer (RtApi) and a ConversationalAiManager. ConversationalAiManager coordinates Output and Input: posting input to backend for processing and getting the response from backend in the form of Output. With reference to FIG. 5I, a state machine is maintained inside (error cases not drawn). The internal state is observed through a state observable from outside. Each state can be associated with a UI view state. (e.g. Voice assistant wave animation). FIG. 5J illustrates a user-interface layer for enabling interaction with a backend voice-assistant process. FIG. 5K illustrates a flow which can be implemented for a service application to implement actionables and other events. Actionable is to be implemented in each individual feature scope. The actionables can be identified by the backend by their respective names. Backend NLP intent classification determines which Actionable's should be performed by name.

Hardware Diagrams

Figure 6:
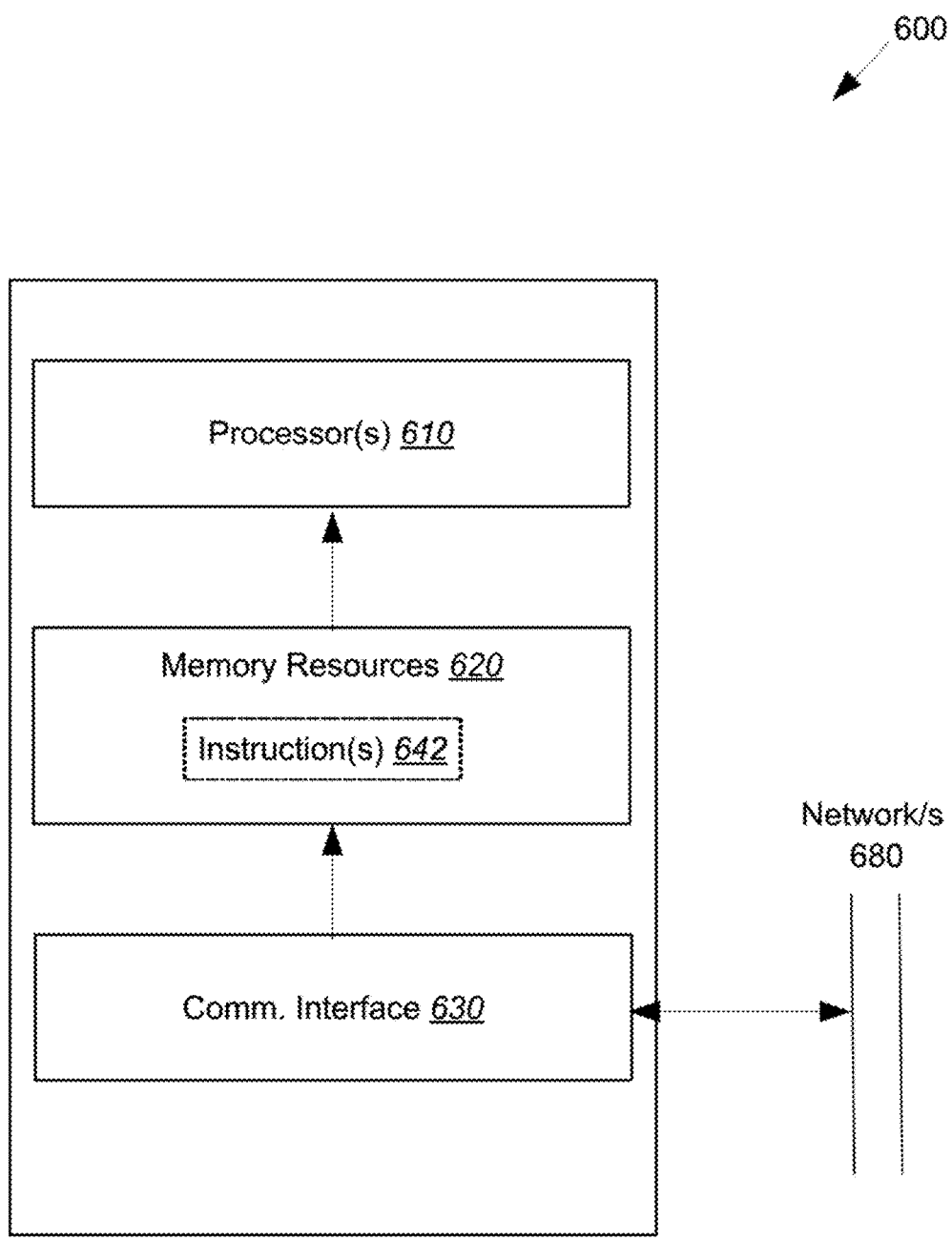
FIG. 6 illustrates a block diagram that illustrates a computer system on which examples described herein may be implemented.

FIG. 6 illustrates a block diagram that illustrates a computer system on which examples described herein may be implemented. For example, in the context of FIG. 1 and FIG. 2, network computer system 100 and/or service arrangement system 200 may be implemented using a computer system or combination of computer systems, such as described by FIG. 6.

In one implementation, the computer system 600 includes one or more processors 610, memory resources 620, and a communication interface 630. The computer system 600 includes at least one processor 610 for processing information. The memory resources 620 may include a random access memory (RAM) or other dynamic storage device, for storing information and instructions to be executed by the processor(s) 610. The memory resources 620 also may be used for storing temporary variables or other intermediate information during execution of instructions to be executed by the processor(s) 610. The computer system 600 may also include other forms of memory resources, such as static storage devices for storing static information and instructions for the processor 610. The memory resources 620 can store information and instructions, including instructions 642 for generating voice-response communications based on service-specific information in order to implement, for example, the service arrangement system 200.

The communication interface 630 can enable the computer system 600 to communicate with one or more networks 680 (e.g., cellular network) through use of the network link (wireless or wireline). Using the network link, the computer system 600 can communicate with one or more other computing devices and/or one or more other servers or data centers. In some variations, the computer system 600 can receive device data and/or service-specific information from provider devices (e.g., provider device 130) and requester devices (e.g., requester device 120) via the network 680 to facilitate generating voice-response communications based on service-specific information in order to implement and other aspects described herein.

Examples described herein are related to the use of the computer system 600 for implementing the techniques described herein. According to one embodiment, those techniques are performed by the computer system 600 in response to the processor 610 executing one or more sequences of one or more instructions contained in the memory resource 620. Such instructions may be read into the memory resources 620 from another machine-readable medium, such as the storage device. Execution of the sequences of instructions contained in the main memory 620 causes the processor 610 to perform the process steps described herein. In alternative implementations, hard-wired circuitry may be used in place of or in combination with software instructions to implement examples described herein. Thus, the examples described are not limited to any specific combination of hardware circuitry and software.

Figure 7:
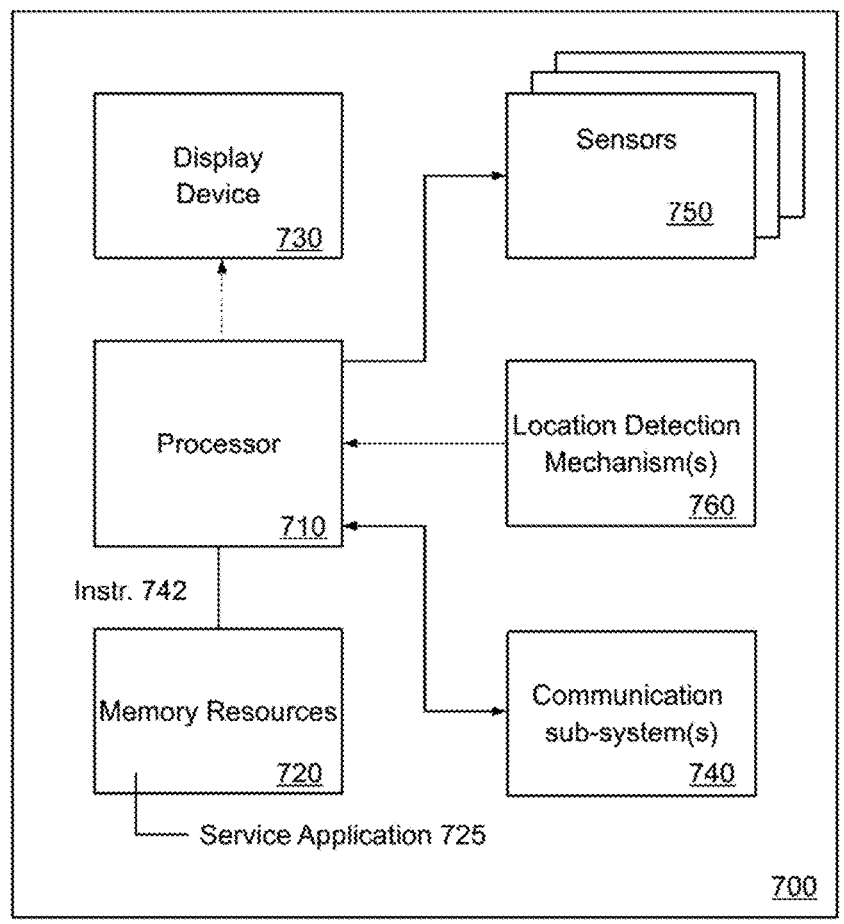
FIG. 7 is a block diagram that illustrates a computing device upon which examples described herein may be implemented.

FIG. 7 is a block diagram that illustrates a computing device upon which examples described herein may be implemented. In one embodiment, a computing device 700 may correspond to a mobile computing device, such as a cellular device that is capable of telephony, messaging, and data services. The computing device 700 can correspond to a device operated by a requester (e.g., requester device 120 and/or requester device 204), or, in some examples, a device operated by the service provider that provides location-based services (e.g., provider device 130 and/or provider device 202). Examples of such devices include smartphones, handsets, tablet devices, or in-vehicle computing devices that communicate with cellular carriers.

The computing device 700 includes a processor 710, memory resources 720, a display device 730 (e.g., such as a touch-sensitive display device), one or more communication sub-systems 740 (including wireless communication sub-systems), one or more sensors 750 (e.g., accelerometer, gyroscope, barometer, altimeter, microphone, camera), and one or more location detection mechanisms (e.g., GPS component) 760. In one example, at least one of the communication sub-systems 740 sends and receives cellular data over data channels and voice channels. The communications sub-systems 740 can include a cellular transceiver and one or more short-range wireless transceivers. The processor 710 can exchange data with a service arrangement system (not illustrated in FIG. 7) via the communications sub-systems 740.

The processor 710 can provide a variety of content to the display 730 by executing instructions stored in the memory resources 720. The memory resources 720 can store instructions for the service application 725. For example, the processor 710 is configured with software and/or other logic to perform one or more processes, steps, and other functions described with mobile computing devices of occupants of vehicles. In particular, the processor 710 can execute instructions and data stored in the memory resources 720 in order to execute a service application, such as described with various examples. In one example, the processor 710 may execute instructions 722 to communicate messages, notifications, service-specific information, and other data between the computing device 700 and the service arrangement system 200.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is claimed is:

1. A network system comprising:
   one or more processors; and
   one or more memory resources storing instructions that, when executed by the one or more processors of the network system, cause the network system to:
   receive, over a network from a user device, a set of request data corresponding to a request for a network-based service, the request data identifying a start location;
   identify, based on the start location, a service provider from a plurality of service providers to fulfill the request for the network-based service, the service provider operating a provider device;
   in response to identifying the service provider for the request, (i) trigger a first audio voice prompt to be presented by the provider device, the first audio voice prompt corresponding to an invitation to fulfill the request for the network-based service, and (ii) trigger the provider device to initiate a listening period during which the provider device monitors for a first audio input from the service provider;
   receive, over the network from the provider device, a first set of response data, the first set of response data being based on the first audio input captured by the provider device;
   determine, based on the received first set of response data, a first provider intent corresponding to whether the service provider accepts or declines the invitation to fulfill the request for the network-based service; and
   in response to determining that the first provider intent corresponds to the service provider accepting the invitation to fulfill the request for the network-based service, cause the provider device to present a navigation user interface for presenting a set of navigation directions to the start location.

2. The network system of claim 1, wherein the executed instructions further cause the network system to determine, based on the first set of response data, a confidence score associated with the first provider intent.

3. The network system of claim 2, wherein determining the first provider intent is based on the confidence score being above a threshold value.

4. The network system of claim 2, wherein the executed instructions further cause the network system to, in response to the confidence score being below a threshold value, cause the provider device to present a second audio prompt corresponding to the invitation to fulfill the request for the network-based service.

5. The network system of claim 2, wherein the executed instructions further cause the network system to, in response to the confidence score being above a low threshold value but below a high threshold value, cause the provider device to present a second audio prompt corresponding to the invitation to fulfill the request for the network-based service.

6. The network system of claim 1, wherein the executed instructions further cause the network system to, in response to identifying the service provider for the request, (iii) present one or more user interface features on a user interface features the provider device, the one or more user interface features being selectable by the service provider to accept or decline the invitation.

7. The network system of claim 6, wherein the one or more user interface features are presented during the listening period.

8. The network system of claim 6, wherein the executed instructions further cause the network system to, in response to receiving a provider input to accept or decline the invitation via the one or more user interface features, terminate the listening period.

9. A computer-implemented method comprising:
   receiving, over a network from a user device, a request for a network-based service, the request identifying a service location;
   identifying, based on the service location, a service provider from a plurality of service providers to fulfill the request for the network-based service, the service provider operating a provider device;
   in response to identifying the service provider for the request, (i) triggering a first audio voice prompt to be presented by the provider device, the first audio voice prompt corresponding to an invitation to fulfill the request for the network-based service, and (ii) triggering the provider device to initiate a listening period during which the provider device monitors for a first audio input from the service provider;
   receiving, over the network from the provider device, a first set of response data, the first set of response data being based on the first audio input captured by the provider device;
   determining, based on the received first set of response data, a first provider intent corresponding to whether the service provider accepts or declines the invitation to fulfill the request for the network-based service; and
   in response to determining that the first provider intent corresponds to the service provider accepting the invitation to fulfill the request for the network-based service, causing the provider device to present a second voice prompt regarding the request for the network-based service.

10. The computer-implemented method of claim 9, further comprising determining, based on the first set of response data, a confidence score associated with the first provider intent.

11. The computer-implemented method of claim 10, wherein determining the first provider intent is based on the confidence score being above a threshold value.

12. The computer-implemented method of claim 10, further comprising, in response to the confidence score being below a threshold value, causing the provider device to present a second audio prompt corresponding to the invitation to fulfill the request for the network-based service.

13. The computer-implemented method of claim 10, further comprising, in response to the confidence score being above a low threshold value but below a high threshold value, causing the provider device to present a second audio prompt corresponding to the invitation to fulfill the request for the network-based service.

14. The computer-implemented method of claim 9, further comprising, in response to identifying the service provider for the request, (iii) presenting one or more user interface features on a user interface features the provider device, the one or more user interface features being selectable by the service provider to accept or decline the invitation.

15. The computer-implemented method of claim 14, wherein the one or more user interface features are presented during the listening period.

16. The computer-implemented method of claim 14, further comprising, in response to receiving a provider input to accept or decline the invitation via the one or more user interface features, terminating the listening period.

17. A non-transitory computer-readable medium storing instructions that, when executed by one or more processors of a network system, cause the network system to:
    receive, over a network from a user device, a request for a network-based service, the request identifying a service location;
    identify, based on the service location, a service provider from a plurality of service providers to fulfill the request for the network-based service, the service provider operating a provider device;
    in response to identifying the service provider for the request, (i) trigger a first audio voice prompt to be presented by the provider device, the first audio voice prompt corresponding to an invitation to fulfill the request for the network-based service, and (ii) trigger the provider device to initiate a listening period during which the provider device monitors for a first audio input from the service provider;
    receive, over the network from the provider device, a first set of response data, the first set of response data being based on the first audio input captured by the provider device;
    determine, based on the received first set of response data, a first provider intent corresponding to whether the service provider accepts or declines the invitation to fulfill the request for the network-based service; and
    in response to determining that the first provider intent corresponds to the service provider accepting the invitation to fulfill the request for the network-based service, cause the provider device to present a second voice prompt regarding the request for the network-based service.

18. The non-transitory computer-readable medium of claim 17, wherein the executed instructions further cause the network system to determine, based on the first set of response data, a confidence score associated with the first provider intent.

19. The non-transitory computer-readable medium of claim 18, wherein determining the first provider intent is based on the confidence score being above a threshold value.

20. The non-transitory computer-readable medium of claim 18, wherein the executed instructions further cause the network system to, in response to the confidence score being below a threshold value, cause the provider device to present a second audio prompt corresponding to the invitation to fulfill the request for the network-based service.

* * * * *